(12) United States Patent
Ismail et al.

(10) Patent No.: US 10,870,088 B1
(45) Date of Patent: *Dec. 22, 2020

(54) COMPOSITE PHOTOCATALYSTS EMBEDDED IN MICROPOROUS MEMBRANES

(71) Applicant: King Abdulaziz University, Jeddah (SA)

(72) Inventors: Iqbal M. I. Ismail, Jeddah (SA); Abdul Hameed, Jeddah (SA); Muhammad Aslam, Jeddah (SA); Mohammad H. Albeirutty, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,783

(22) Filed: Oct. 7, 2019

(51) Int. Cl.
*B01D 69/14* (2006.01)
*B01J 35/06* (2006.01)
(Continued)

(52) U.S. Cl.
CPC ....... *B01D 69/145* (2013.01); *B01D 67/0079* (2013.01); *B01D 71/16* (2013.01);
(Continued)

(58) Field of Classification Search
CPC .. B01D 59/34; B01D 2255/802; B01J 35/004; B01J 35/006; B01J 23/16; B01J 2523/27; B01J 2531/26; C02F 2305/10
See application file for complete search history.

(56) References Cited

U.S. PATENT DOCUMENTS

| 2013/0015122 A1 | 1/2013 | Awadh |
| 2016/0129432 A1* | 5/2016 | Ozaki ................. B01J 35/0013 423/245.1 |
| 2017/0203258 A1 | 6/2017 | Darling et al. |

FOREIGN PATENT DOCUMENTS

| CN | 102600732 A | 7/2012 |
| CN | 104383821 A | 3/2015 |

(Continued)

OTHER PUBLICATIONS

Kuvarega, et al. ; Photocatalytic Membranes for Efficient Water Treatment ; Semiconductor Photocatalysis—Materials, Mechanisms, and Applications ; pp. 523-539 ; IntechOpen ; 2016 ; 19 Pages.

(Continued)

*Primary Examiner* — Vishal V Vasisth
(74) *Attorney, Agent, or Firm* — Oblon, McClelland, Maier & Neustadt, L.L.P.

(57) ABSTRACT

Photocatalytic materials with a composite photocatalyst of a metal oxide impregnated with elemental metal particles, can be embedded into a hydrophilic polymer having pores with diameters of less than 2 nm, to provide a useful water remediation and/or purification product. The metal oxide may be $WO_3$, $Ce_2$, $Bi_2O_3$, NiO, $TiO_2$, and/or ZnO, and the elemental metal particles, impregnated or compounded into the metal oxide, may be Fe, Co, Ni, Cu, Ag, Ce, Mn, Mo, V, Bi, Sn, W, Nb, Pd, and/or Pt. The photocatalytic materials may be easily removed and/or retrieved after use, and can effectively combat both chemical and biological contamination and/or fouling of water as well as the membranes composed of the photocatalytic material.

20 Claims, 17 Drawing Sheets

(51) Int. Cl.
| | |
|---|---|
| *B01J 35/00* | (2006.01) |
| *B01J 37/04* | (2006.01) |
| *B01J 37/08* | (2006.01) |
| *B01D 67/00* | (2006.01) |
| *B01J 23/34* | (2006.01) |
| *B01J 23/22* | (2006.01) |
| *B01J 23/30* | (2006.01) |
| *B01J 23/28* | (2006.01) |
| *B01J 23/80* | (2006.01) |
| *B01J 23/10* | (2006.01) |
| *B01D 71/16* | (2006.01) |
| *C02F 1/44* | (2006.01) |
| *C02F 1/32* | (2006.01) |
| *C02F 1/72* | (2006.01) |
| *B01J 35/10* | (2006.01) |

(52) U.S. Cl.
CPC ............ *B01J 23/10* (2013.01); *B01J 23/22* (2013.01); *B01J 23/28* (2013.01); *B01J 23/30* (2013.01); *B01J 23/34* (2013.01); *B01J 23/80* (2013.01); *B01J 35/004* (2013.01); *B01J 35/065* (2013.01); *B01J 35/1057* (2013.01); *B01J 37/04* (2013.01); *B01J 37/08* (2013.01); *C02F 1/32* (2013.01); *C02F 1/44* (2013.01); *C02F 1/725* (2013.01); *C02F 2305/10* (2013.01)

(56) References Cited

FOREIGN PATENT DOCUMENTS

| | | |
|---|---|---|
| CN | 107999111 A | 5/2018 |
| JP | 9-85058 | 3/1997 |

OTHER PUBLICATIONS

Chen, et al. ; Enhancing the photocatalytic and antibacterial property of polyvinylidene fluoride membrane by blending Ag—TiO nanocomposites ; Journal of Materials Science: Materials in Electronics, vol. 28, Issue 4 ; pp. 3865-3874 ; Feb. 2017 ; Abstract Only ; 1 Page.

Wang, et al. ; Highly hydrophilic poly(vinylidene fluoride)/mesotitania hybrid mesoporous membrane for photocatalytic membrane reactor in water ; Scientific Reports ; Jan. 12, 2016 ; 10 Pages.

Wang, et al. ; Performance improvement of hybrid polymer membranes for wastewater treatment by introduction of micro reaction locations ; Progress in Natural Science: Materials International 28 ; pp. 148-159 ; 2018 ; 12 Pages.

Zahid, et al. ; A Comprehensive Review on Polymeric Nano-Composite Membranes for Water Treatment ; Journal of Membrane Science & Technology vol. 8, Issue 1 ; Mar. 31, 2018 ; 20 Pages.

* cited by examiner

COMPOSITE PHOTOCATALYSTS EMBEDDED IN MICROPOROUS MEMBRANES

BACKGROUND OF THE INVENTION

Field of the Invention

The present disclosure relates to photocatalytic materials, particularly photocatalysts embedded micro-porous hydrophilic polymer membranes, which membranes may be microporous and/or which photocatalytic materials may self-regenerate capable. The present disclosure also relates to purification processes, particularly of water, preferably simultaneous single-step removal of chemical and biological contaminants from water, without leaving toxic by-products, meanwhile inhibiting fouling under natural sunlight or artificial light.

Description of the Related Art

Clean water is essential to human life on earth. Although tertiary level water purification by reverse osmosis (RO) membranes are an effective measure, low rejection rates of chemical contaminants, especially pollutants from the chemical and pharmaceutical industries, require the use of coupled tools for the complete removal of toxicants. The complete mineralization of chemical pollutants under natural sunlight using non-toxic and inexpensive nano-sized photocatalyst is an attractive option, though the removal of the photocatalysts after decontamination has been an issue of concern.

Reverse osmosis (RO) technology based on polymeric membranes for tertiary water purification is an established tool for water purification. In RO, a water feed is flowed, pushed, or pumped through a semipermeable membrane, thereby rejecting or excluding undesired dissolved solids such as inorganic ions. The structure and chemistry of the membrane material plays an important role in the economy and efficiency of RO.

Asymmetric cellulose acetate membranes made by phase inversion techniques are widely used in RO systems. Although efficient in rejecting dissolved ions, cellulose acetate membranes suffer from a low rejection rate of organic and biological contaminants, often requiring additional treatment(s) to purify water by RO. Reduced temporal efficiency of cellulose acetate-based RO systems is often due to the precipitation of salts and the adsorption/interaction of organic matter, chemical, and biological contaminants on the surface of the membranes, blocking the pores, and, consequently, water passage. Such blockage may necessitate replacement of the membrane and jeopardize the economic and technical viability of cellulose acetate membranes Various tools have been adopted to enhance the antifouling properties of existing traditional cellulose acetate membranes. Polymer composite formation and surface modification have been regarded as promising developments for suppressing known and undesired fouling mechanisms, enhancing the lifespan, and sustaining the efficiency of cellulose acetate membranes. However, low rejection of dissolved carcinogenic chemical and biological contaminants still requires attention to enhance the effectiveness of RO cellulose acetate membranes, increase the membrane lifespan, and allow water purification by RO without further treatment(s).

Highly energetic radical oxidizers can completely mineralize contaminants in water streams. Therefore, photocatalysis to generate such radical oxidizers is an emerging technology for addressing water treatment and other environmental concerns. Photocatalysis requires a semiconductor photocatalyst, a light source as an initiator, and a medium capable of generating the oxidizing radicals.

Certain metal oxides, which are naturally abundant, freely available, cheap, and non-hazardous, have established their efficacy as photocatalysts for the removal of hazardous organic compounds in tertiary purification, removing contaminants present at ppm levels. Among such metal oxides, $TiO_2$ and ZnO, with the band gaps in the near UV range, have been extensively studied. Although both $TiO_2$ and ZnO have associated drawbacks, these drawbacks can be largely overcome or at least reduced by surface modification or structural alteration.

The other essential requirement in photocatalysis is the availability of a light source capable of emitting photons of a wavelength matching the bandgap of the semiconductor photocatalyst. Widespread commercial applicability of artificial light sources for environmental remediation has been constrained by costs and energy waste. Sunlight comprises 3 to 5% UV content, and is regarded as the most suitable and cost-free alternative to expensive artificial light sources. Sunlight is in fact the only source presently available that can be considered for commercial, large-scale applicability in photocatalytic processes. The use of sunlight in photocatalysis, however, requires the surface modification of the known active catalysts such as $WO_3$, $CeO_2$, $Bi_2O_3$, NiO, and ZnO to enhance their response to sunlight exposure. Surface modification of ZnO using transition metal impregnation, non-transition metal impregnation, or composite formation, is regarded as viable tool to enhance the spectral response of ZnO in natural sunlight and also augment the overall photocatalytic performance of ZnO by suppressing the recombination of charge carriers.

The recovery of the photocatalyst, when used in the dispersed powder form, is another constraint associated with photocatalysis. Embedding the photocatalyst(s) in a porous transparent medium, such as cellulose acetate, could address the issue of retrievability, though such an approach has been laden with uncertainty due to interference with the bandwidth, diffusion of charge carriers and contaminants, and other known problems associated with plastics such as cellulose acetate.

Tertiary water purification using reverse osmosis (RO) membranes could become a viable option if the low rejection rates of chemical contaminants, especially the pollutants from chemical and pharmaceutical industry, could be addressed. This has traditionally required using coupled tools for toxin removal. Biological fouling of RO membranes has also been a concern. It has been hoped that incorporating photocatalyst particles into RO membranes for tertiary water purification could address the issues of chemical decontamination as well as biological membrane fouling. Certain efforts towards resolving the above issues have already been undertaken in the art.

US 2017/0203258 A1 by Darling et al. (Darling) discloses a method for making a porous membrane for pollutant and particle filtration by coating the membrane with conformal thin films of doped $TiO_2$ via atomic layer deposition (ALD) or sequential infiltration synthesis (SIS). Darling's membrane can either be organic or inorganic, and the membrane doping, usually with nitrogen, is an important feature that shifts $TiO_2$'s optical absorption from the UV range into the visible-light range. Darling's doping enables the use of lower energy light, including sunlight, to activate the photocatalytic function of the film. Darling's coating is compatible with most porous membranes and allows pore size tuning with molecular precision. Darling's material has catalytic activity, strongly enhanced by light, to both mitigate fouling and break down various organic pollutants in the process stream. Darling's base material can be ceramic, a polymer, a cellulose acetate, a metal, or a metal oxide, nitride, sulfide, chalcogenide, carbide, or phosphide. Darling's base polymer may be PES, PVDF, PTFE, PU, PC, polyimides, acrylics, polyamides, polyesters, polyaramides, cellulose acetate, or any other suitable base material which can be used to form the membrane, and the base metal may preferably include $Al_2O_3$, $ZrO_2$, or $TiO_2$ with pores in the 1 to 5000 nm range. Darling does not specifically select an inorganic photocatalyst embedded in a polymer membrane, nor a photocatalyst comprising a metal oxide impregnated with metal particles.

JP H09-085058 A by Uenishi et al. (Uenishi) discloses a water treatment filter membrane that suppresses contamination with water-borne contaminants and clogging of pores, while photocatalytically decomposing contaminants. Uenishi's photocatalyst is supported on a porous membrane bonded with a hydrophilic polymer to obtain Uenishi's filter membrane. Uenishi's photocatalyst and the hydrophilic polymer are supported on at least the surface of the porous membrane. Uenishi's porous film may be PE, PP, poly(4-methyl-1-pentene) (PMP), etc. Uenishi's membrane surface layer may be a polysulfone-based polymer, such as PES or polyallylsulfone, ethylene-vinyl alcohol copolymer, partially saponified EVA copolymer, diacetone acrylamide polymer, etc. Uenishi's photocatalyst may be $TiO_2$, ZnO, $WO_3$, $NbO_3$, CdS, or partial hydrolyzates $Ti(OR)_3$ or $Zn(OR)_2$. Uenishi does not describe a composite of metal oxide and metal particles, nor a contiguous hydrophilic polymer base.

CN 104383821 A by Xu et al. (Xu) discloses an organic-inorganic composite hydrophilic separation membrane for photocatalytic degradation of pollutants. Xu blends magnetic $MFe_2O_4$—$TiO_2$-graphene oxide (M is Fe, Co, Zn, Cu, Ni, or Mn) core-shell structure, polymer resin, solvent, and additive in a membrane casting solution; applies a magnetic field, and immerses in a coagulation bath to obtain the composite separation membrane. Xu's polymer may be PAN, PVA, PVP, PVDF, PU, or polyamide. Xu requires graphene oxide and iron oxide, disclosing apparently a mixed metal oxide-metal oxide, rather than a metal-metal oxide photocatalyst.

CN 107999111 A by Bao et al. (Bao) discloses a photocatalytic composite and a method for preparing a modified photocatalytic PVDF film. Bao describes an (H)g-$C_3N_4$—$TiO_2$/$Ag_3PO_4$ photocatalytic composite in a PVDF film modified by adding the (H)g-$C_3N_4$—$TiO_2$/$Ag_3PO_4$. Bao at least fails to disclose a composite metal oxide-metal photocatalyst.

US 2013/0015122 A1 by Awadh (Awadh) discloses a nanocomposite membrane of carbon nanotubes coated or chemically bonded with metal oxide nanoparticles. Awadh's composite is embedded within a polymeric matrix via interfacial polymerization on a polysulfone support. Awadh's metal oxide particles are catalytically active for filtering pollutants from water in a water treatment system, separating gas from liquid, or selectively separating particles or ions from solution for reverse osmosis (e.g., desalination). Awadh exemplifies only $TiO_2$ as the metal oxide and does not disclose a metal oxide impregnated with elemental metal particles.

CN 102600732 A by Chen et al. (Chen) discloses preparing a bipolar membrane by: mixing carboxymethylcellulose and polyvinyl alcohol to prepare a PVA-CMC cation exchange membrane, then dissolving chitosan in aq. acetic acid, adding a solar photocatalyst, dipping in a glutaraldehyde solution, and casting on the PVA-CMC membrane. Chen's solar photocatalyst is $Co^{2+}$—$TiO_2$, $Fe^{3+}$—$TiO_2$, $Cr^{3+}$—$TiO_2$, N—$TiO_2$, S—$TiO_2$, P—$TiO_2$, or C—$TiO_2$, and Chen's mass ratio of chitosan to photocatalyst is 3.0 to 6.0:0.001 to 0.1. Chen does not disclose a metal oxide impregnated with metal particles.

Kuvarega, A.; Mamba, B. B. "Photocatalytic Membranes for Efficient Water Treatment" in *Semiconductor Photocatalysis-Materials. Mechanisms and Applications*, Ch. 19, London, IntechOpen: 2016, pp. 524-539, http://dx.doi.org/10.5772/62584 (Kuvarega) discloses membrane processes combining physical separation through filtration and photocatalytic pollutant degradation or bactericide in a single unit for wastewater treatment. Kuvarega describes photocatalytic membranes, such as polyamide, PVDF, polysulfone, PES, sulfonated polyethersulfone (SPES), PU, PET, polyester, PAN, and PTFE, as well as inorganic membrane, incorporating metal-oxide photocatalysts, mainly $TiO_2$. Kuvarega describes that $TiO_2$ loading, light intensity, and irradiation time affect membrane performance. Kuvarega does not describe a composite material impregnated with metal particles as a photocatalyst.

*J. Mat. Sci. Mat. Elect.* 2017, 28(4), 3865-3874 by Chen et al. (Chen NPL) discloses a novel polyvinylidene fluoride (PVDF) ultrafiltration membrane with photocatalytic and antibacterial properties, prepared by phase inversion. The Chen NPL describes immobilizing silver (Ag) nanoparticles with titanium dioxide ($TiO_2$) nanoparticles, and adding the Ag—$TiO_2$ into the casting solution to make modified PVDF. Chen describes photocatalytically degrading surface contamination better than membrane without Ag—$TiO_2$, as well as an antibacterial property. Chen does not clearly indicate embedding Ag within $TiO_2$.

*Sci. Rep.* 2016, 6, 19148, 1-10 by Wang et al. (M. Wang) discloses a hydrophilic hybrid mesoporous membrane of mesoporous anatase $TiO_2$ inside 3D macropores of a PVDF membrane suitable for photodegrading organic dye in water. M. Wang reports improving the hydrophilicity of PVDF by filling mesoporous $TiO_2$ inside the PVDF macropores. M. Wang's PVDF-meso-$TiO_2$ hybrid membrane can photocatalytically degrade dye in water, but M. Wang does not describe a composite photocatalyst, much less one with a metal oxide impregnated with metal particles.

*Prog. Nat. Sci. Mat. Inter.* 2018, 28(2), 148-159 by Wang et al. (Y. Wang) discloses polymer membranes embedded with inorganic nanomaterials to provide micro reaction locations (MRLs) in the polymer matrices for wastewater treatment. Y. Wang's ultrafiltration (UF) membranes, especially PVDF and polysulfone (PSF) membranes, may have embedded functional nanomaterials such as sulfated $TiO_2$ deposited $SiO_2$ nanotubes, solid superacid, porous $ZrO_2$ shell/void/$TiO_2$ core particles, and porous $Y_xFe_yZr_{1-x-y}O_2$-coated $TiO_2$ solid superacid nanoparticles. Y. Wang does not describe a composite photocatalyst having a metal oxide impregnated with elemental metal particles.

*J. Memb. Sci. Technol.* 2018, 8(1), 1000179, 1-20, by Zahid et al. (Zahid) discloses membrane-based separations and fouling and hydrophobicity problems. Zahid describes metal-based and carbon-based polymeric nanocomposite membranes with antifouling characteristics and using nanomaterials to impart selectivity, permeability, hydrophilicity, thermal stability, mechanical strength, and antibacterial properties to polymeric membranes via blending, coating, and other modification methods. Zahid reports membranes to include PVA, PES, PVDF, PU, PVC, PP, PAN, polyimide (PI), PE, cellulose acetate (CA), polysulfone, polyamide, and chitosan, and metal oxides such as zeolites, $TiO_2$, $ZrO_2$, $Al_2O_3$, $SiO_2$, $Fe_2O_3$, ZnO, Ti—$SiO_4$ and Ag. Zahid does not disclose a polymer membrane comprising a metal oxide composite comprising metal particles.

In light of the above, a need remains for photocatalytic materials useful in treating water, particularly for forms in which the photocatalysts are more easily recovered and removed from the water than known arrangements, such as photocatalysts embedded in integral polymer bulks, particularly UV and/or visible-light transparent and/or hydrophilic polymer, and methods of making such photocatalytic materials.

SUMMARY OF THE INVENTION

Aspects of the invention provide photocatalytic materials, which may comprise: a composite photocatalyst comprising a metal oxide impregnated with metal particles; and a hydrophilic polymer having pores with diameters of less than 2 nm, wherein the photocatalyst is embedded in microporous hydrophilic polymer membrane, wherein the metal oxide comprises $WO_3$, $CeO_2$, $Bi_2O_3$, NiO, $TiO_2$, and/or ZnO, and wherein the metal particles comprise elemental Fe, Co, Ni, Cu, Ag, Ce, Mn, Mo, V, Bi, Sn, W, Nb, Pd, and/or Pt. Such a material may be modified by any permutation of the features described herein, particularly the following.

The hydrophilic polymer may comprise cellulose acetate, polyether sulfone, polysulfone, and/or polyvinylidene difluoride. The hydrophilic polymer may make out at least 90 wt. % of all polymers present in the membrane.

The membrane may be a single, integral bulk completely surrounding at least a portion of the photocatalyst. The membrane may surround at least 90 wt. % of the photocatalyst, relative to all photocatalyst present in the material.

The metal oxide may be impregnated with metal particles in an amount in a range of 0.1 to 50% by weight of a total photocatalyst weight.

At least 95 wt. % of the metal may be in a zero oxidation state. The photocatalyst may comprise a single metal oxide and/or a single elemental metal.

The photocatalyst may comprise: at least 95 wt. % of a single metal oxide, relative to all metal oxide present in the photocatalyst; and/or at least 95 wt. % of a single elemental metal, relative to all elemental metal present in the photocatalyst.

Aspects of the invention comprise methods of preparing a photocatalyst embedded in polymer membrane, which may include any permutation of the inventive photocatalytic material described herein. Inventive methods may comprise: (a) heating an aqueous solution comprising an acid, a metal salt, and miscible organic solvent to produce metal oxide comprising $WO_3$, $CeO_2$, $Bi_2O_3$, NiO, $TiO_2$, and/or ZnO; (b) mixing an aqueous solution of a precursor of a metal comprising Fe, Co, Ni, Cu, Ag, Ce, Mn, Mo, V, Bi, Sn, W, Nb, Pd, and/or Pt and the metal oxide to form a mixture comprising the metal embedded in the metal oxide; (c) heating and/or calcining the mixture to form a photocatalyst; (d) blending the photocatalyst with a solution comprising a polymer in a (preferably organic) solvent to form a solution and/or compounding the photocatalyst with the polymer to form a compounded melt, in a mass relationship of the photocatalyst in a range of from 0.1 to 100% of a weight of the polymer; and/or (e) forming a membrane.

The heating (a) may be at a temperature in a range of from 80 to 160° C. and/or for a time in a range of 2 to 24 hours.

The acid in the heating (a) may comprise at least 25 wt. % acetic acid, relative to all acids in the mixture. The organic solvent in the heating (a) may be an alcohol.

The forming (e) may comprise casting the solution or extruding the compounded melt.

The heating (c) may comprise bringing the mixture to dryness, adding a flammable liquid, and/or igniting to form the photocatalyst.

The polymer may be hydrophilic and/or may comprise pores having diameters up to 2 nm.

Aspects of the invention include methods of preparing any permutation of the inventive photocatalytic material(s) described herein, the method comprising: blending the photocatalyst with a solution comprising a polymer in a (preferably organic) solvent and/or compounding the photocatalyst with the polymer; and forming a membrane.

Aspects of the invention provide methods of inactivating at least one biological contaminant in water, the method comprising: while irradiating with a source of UV and/or visible light, contacting any permutation of the inventive photocatalytic material(s) described herein with contaminated water.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
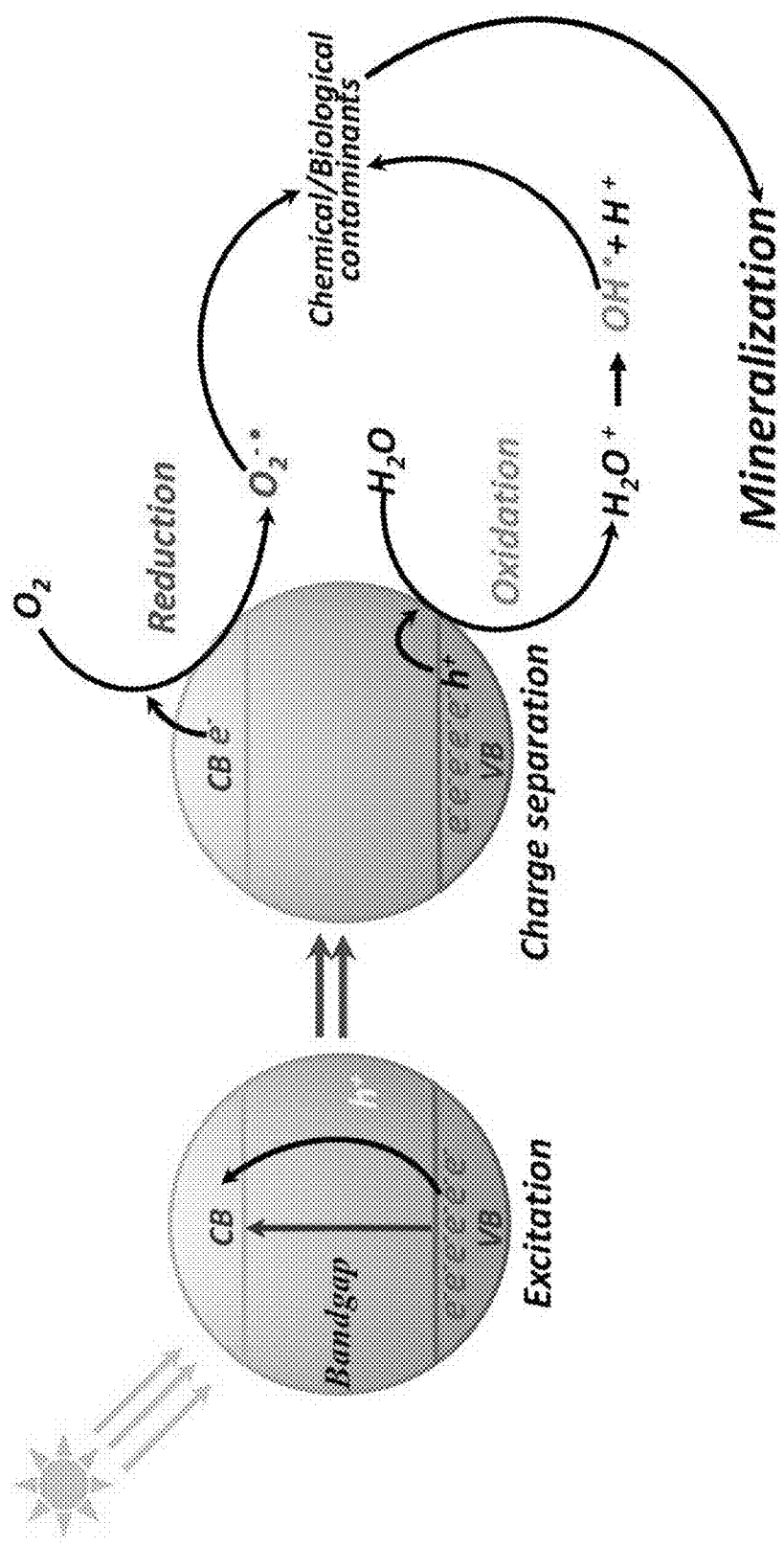
FIG. 1 shows a schematic diagram of an exemplary photocatalytic decontamination process within the scope of the invention.
Figure 2A:
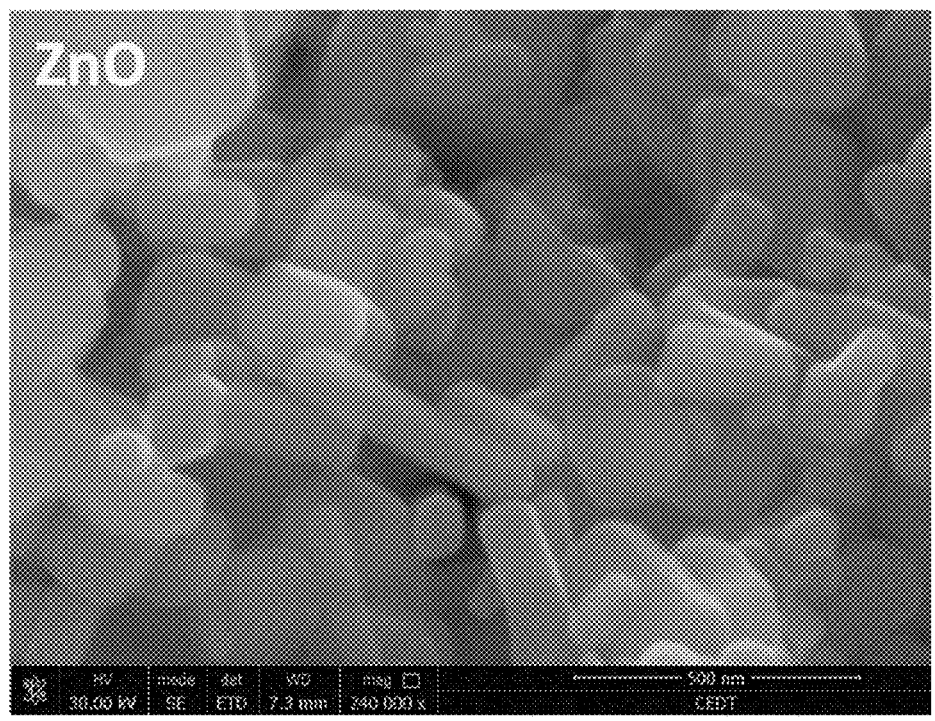
FIG. 2A shows a field emission scanning electron microscope (FE-SEM) image of ZnO, illustrating the morphology of ZnO, a representative base material.
Figure 2B:
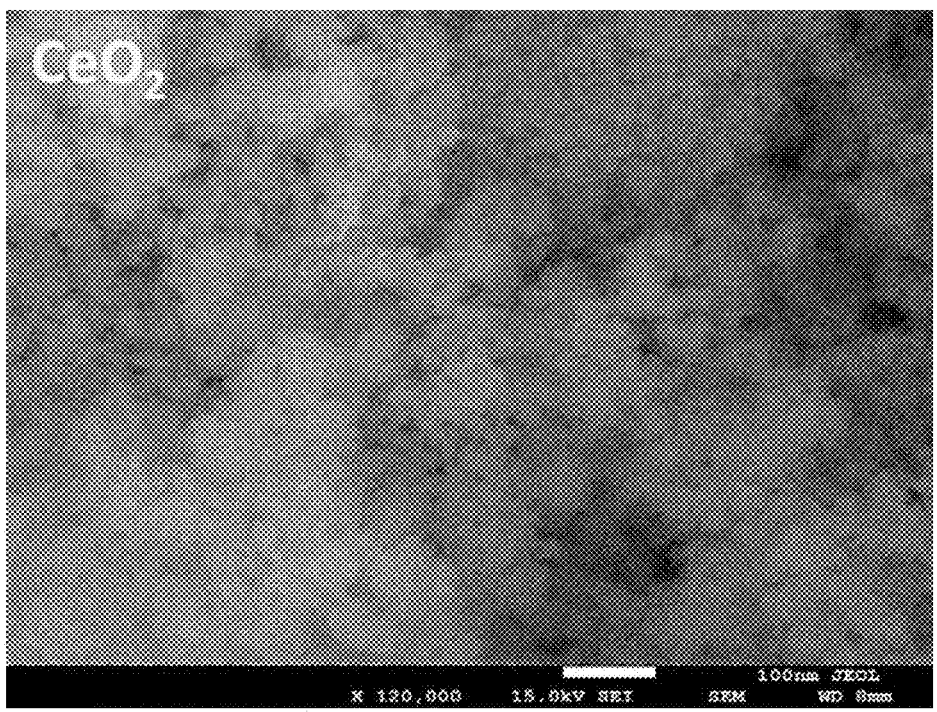
FIG. 2B shows an FE-SEM image of $CeO_2$, illustrating the morphology of $CeO_2$, a representative base material.
Figure 2C:
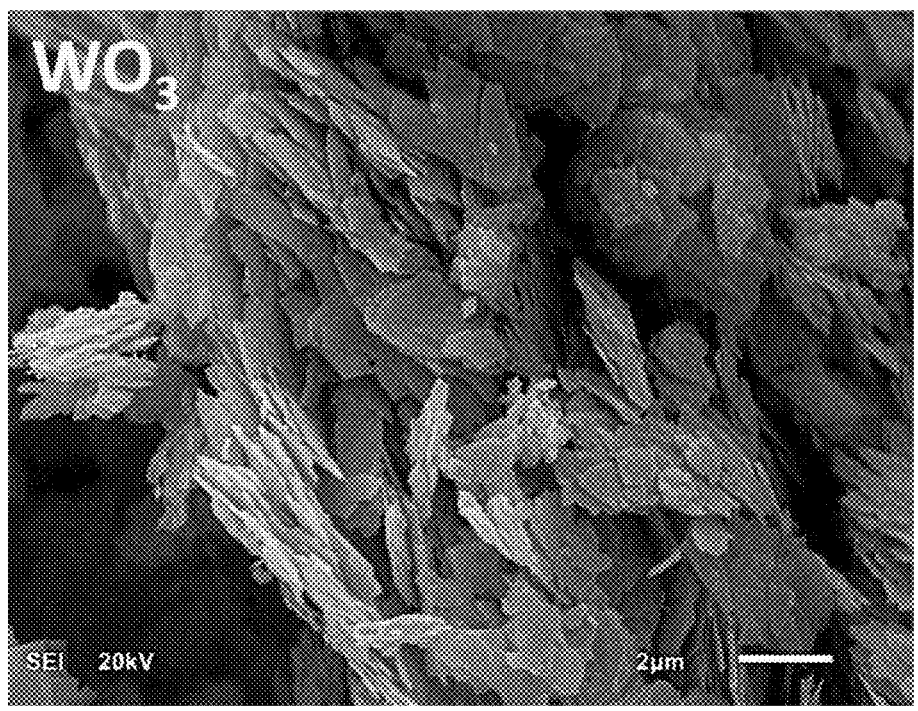
FIG. 2C shows an FE-SEM image of $WO_3$, illustrating the morphology of $WO_3$, a representative base material.
Figure 2D:
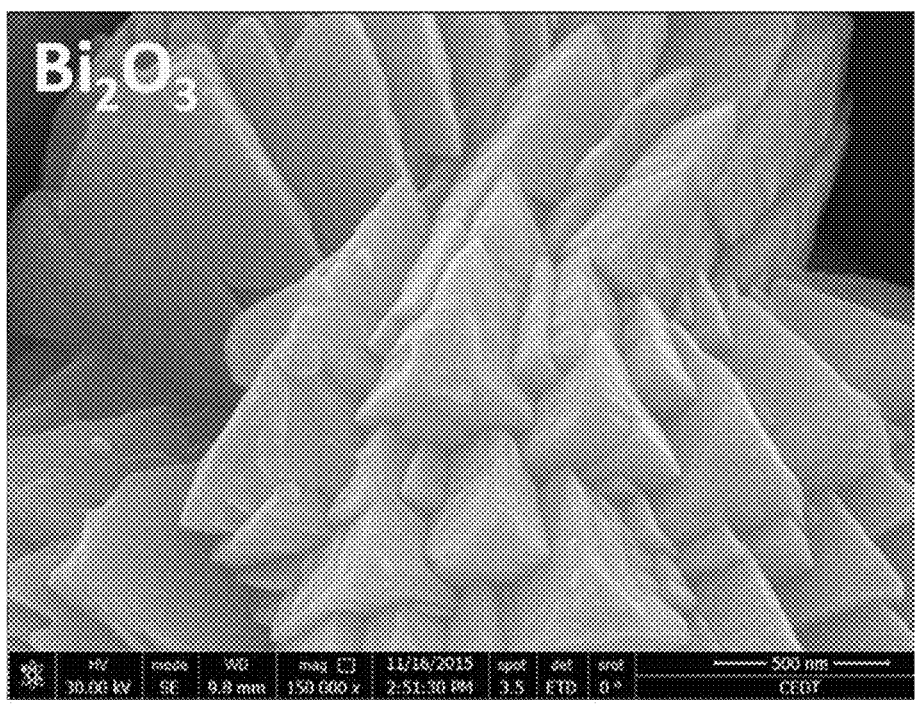
FIG. 2D shows an FE-SEM image of $Bi_2O_3$, illustrating the morphology of $Bi_2O_3$, a representative base material.

Aspects of the invention provide photocatalytic materials, which may comprise: a composite photocatalyst comprising a metal oxide impregnated with elemental metal particles, i.e., metal(s) having a zero oxidation state; and a hydrophilic polymer having pores with diameters of less than 2 nm, wherein the photocatalyst is embedded in microporous hydrophilic polymer membrane, wherein the metal oxide comprises $WO_3$, $Ce_2$, $Bi_2O_3$, NiO, $TiO_2$, and/or ZnO, and wherein the metal particles comprise elemental Fe, Co, Ni, Cu, Ag, Ce, Mn, Mo, V, Bi, Sn, W, Nb, Pd, and/or Pt. The elemental metal(s) may likewise be embedded within the metal oxide(s) as described below, i.e., at least some of the elemental metal particles may be completely encompassed by or encased within a metal oxide bulk.

The hydrophilic polymer may have only pores with no more than 2 nm diameter, or the pores may be substantially micropores, e.g., at least 50, 60, 70, 75, 80, 85, 90, 95, 96, 97, 97.5, 98, 99, 99.1, 99.5, or 99.9.% micropores, relative to all other pores. The polymer bulk/matrix and/or the photocatalyst-embedded material may further include mesopores and/or macropores, e.g., less 50, 40, 33.3, 30, 27.5, 22.5, 16.6, 12.5, 10, 7.5, 5, 2.5, or 1%, based on total pore count, of mesopores and/or macropores, either separately or in combination.

The term "embedded" herein means that at least a portion, generally the majority or at least 75, 85, 90, 92.5, 95, 97.5% or more, of total photocatalyst particles, are surrounded within the matrix, i.e., completely enveloped or 100% spatially/volumetrically submerged/encased, and not merely perched upon an outer surface and/or only 50 to 75% of the particle body sunken into the surface of the polymer bulk. The porosity of the polymer matrix/bulk should serve to allow transport of the charge-carriers to and from the photocatalysts embedded within the (preferably hydrophilic) polymer bulk. A majority of the photocatalyst particle weight, e.g., at least 50, 60, 70, 75, 80, 85, 90, 95% or more of the particles, may be submerged inside a depth of the polymer at least 5, 10, 15, or 20% of the thickness of the membrane from the outer surface of the membrane.

The composite photocatalyst may be any combination of $WO_3$, $Ce_2$, $Bi_2O_3$, NiO, $TiO_2$, and/or ZnO, with elemental Fe, Co, Ni, Cu, Ag, Ce, Mn, Mo, V, Bi, Sn, W, Nb, Pd, and/or Pt. That is, a metal oxide may contain 1, 2, 3, 4, . . . up to all of the elemental metals listed, though the photocatalyst is generally sufficient with a single metal oxide and a single elemental metal. Examples of suitable 1-to-1 photocatalysts, include one or more of:

Fe—$WO_3$, Co—$WO_3$, Ni—$WO_3$, Cu—$WO_3$, Ag—$WO_3$, Ce—$WO_3$, Mn—$WO_3$, Mo—$WO_3$, V—$WO_3$, Bi—$WO_3$, Sn—$WO_3$, W—$WO_3$, Nb—$WO_3$, Pd—$WO_3$, Pt—$WO_3$;

Fe—$CeO_2$, Co—$CeO_2$, Ni—$CeO_2$, Cu—$CeO_2$, Ag—$CeO_2$, Ce—$CeO_2$, Mn—$CeO_2$, Mo—$CeO_2$, V—$CeO_2$, Bi—$CeO_2$, Sn—$CeO_2$, W—$CeO_2$, Nb—$CeO_2$, Pd—$CeO_2$, Pt—$CeO_2$;

Fe—$Bi_2O_3$, Co—$Bi_2O_3$, Ni—$Bi_2O_3$, Cu—$Bi_2O_3$, Ag—$Bi_2O_3$, Ce—$Bi_2O_3$, Mn—$Bi_2O_3$, Mo—$Bi_2O_3$, V—$Bi_2O_3$, Bi—$Bi_2O_3$, Sn—$Bi_2O_3$, W—$Bi_2O_3$, Nb—$Bi_2O_3$, Pd—$Bi_2O_3$, Pt—$Bi_2O_3$;

Fe—NiO, Co—NiO, Ni—NiO, Cu—NiO, Ag—NiO, Ce—NiO, Mn—NiO, Mo—NiO, V—NiO, Bi—NiO, Sn—NiO, W—NiO, Nb—NiO, Pd—NiO, Pt—NiO;

Fe—$TiO_2$, Co—$TiO_2$, Ni—$TiO_2$, Cu—$TiO_2$, Ag—$TiO_2$, Ce—$TiO_2$, Mn—$TiO_2$, Mo—$TiO_2$, V—$TiO_2$, Bi—$TiO_2$, Sn—$TiO_2$, W—$TiO_2$, Nb—$TiO_2$, Pd—$TiO_2$, Pt—$TiO_2$;

Fe—ZnO, Co—ZnO, Ni—ZnO, Cu—ZnO, Ag—ZnO, Ce—ZnO, Mn—ZnO, Mo—ZnO, V—ZnO, Bi—ZnO, Sn—ZnO, W—ZnO, Nb—ZnO, Pd—ZnO, Pt—ZnO.

In addition, the various metal oxides may contain multiple elemental metals selected from Fe, Co, Ni, Cu, Ag, Ce, Mn, Mo, V, Bi, Sn, W, Nb, Pd, and/or Pt, and/or one or more of the aforementioned elemental metals may be combined with 1, 2, 3, 4, 5, or 6 of $WO_3$, $CeO_2$, $Bi_2O_3$, NiO, $TiO_2$, and/or ZnO.

The hydrophilic polymer may comprise one or more of cellulose acetate (including cellulose acetate propionate and/or butyrate), polyether sulfone, polysulfone, and polyvinylidene difluoride. Examples of such polymers may include cellulose acetate, cellulose acetate propionate, cellulose acetate butyrate, cellulose propionate, cellulose butyrate, coupling/condensation polymers of diphenyl ether or dinaphthyl ether and 1,4-di(halosulfonyl)benzene, coupling/condensation polymers of bis(4-halophenyl)sulfone and bisphenol-A or 1,4-dihydroxybenzene, poly(oxy-1,4-phenylsulfonyl-1,4-phenylene), poly(phenylene sulfone), poly(oxy-1,4-phenyleneoxy-1,4-phenylenesulfonyl-1,4-phenylene), poly[oxy-1,4-phenylenesulfonyl-1,4-phenyleneoxy-1,4-phenylene(dimethylmethylene)-1,4-phenylene], PVDF, polyperfluorocycloalkenes (PFCA), poly(vinyl fluoride) (PVF), poly(tetrafluoroethylene) (PTFE), poly(chlorotrifluoroethylene) (PCTFE), poly(hexafluoropropylene) (PHFP), poly(perfluoropropylvinylether) (PPPVE), and/or poly(perfluoromethylvinylether) (PPMVE), as well as any further polymers discussed below. In the aforementioned compounds, "halo" may mean. e.g., chloro, bromo, iodo, or fluoro.

The (preferably hydrophilic) polymer, i.e., matrix polymer, may make out at least 90, 91, 92, 92.5, 93, 94, 95, 96, 97, 97.5, 98, 99, 99.1, 99.5, or 99.9 wt. % of all polymers present in the membrane. That is, the matrix polymer may be the only polymeric and/or carbonaceous material in the membrane, or the membrane may consist essentially of the matrix polymer (preferably hydrophilic polymer) and the photocatalyst—without further polymers and/or additives which would diminish the photocatalytic activity by more than 10 or 5% (oxidative strength and/or electron generation rate).

The membrane may be a single, integral bulk completely surrounding at least a portion of the photocatalyst. That is, the photocatalytic material may have only the matrix polymer and the photocatalyst(s) within the polymer matrix, without any further coatings and/or layers. The membrane may surround at least 75, 85, 90, 92.5, 95, 97.5, 98, 99, 99.1, 99.5, or 99.9 wt. % of the photocatalyst, relative to all photocatalyst present in the material.

The metal oxide may be impregnated with the metal particles in an amount in a range of 0.1 to 50 wt. % of a total photocatalyst weight. For example, the (elemental) metal particles may be present at up to a 1:1 weight ratio with the metal oxide(s), or up to 1:1.25, 1:1.5, 1:1.75, 1:2, 1:3, 1:4, 1:5, 1:10, 1:20, 1:25, 1:33, 1:40, or 1:50. The impregnation of elemental metal into the metal oxide may be, e.g., any of these endpoints and/or at least 0.25, 0.5, 1, 2.5, 5, 7.5, 10, 12.5, 15, 17.5, 20, or 25 wt. % and/or up to 50, 45, 40, 33, 25, 20, 15, 10, 7.5, 5, 4, 3, 2, 1, or 0.5 wt. %, relative to the total photocatalyst weight.

At least 95, 96, 97, 97.5, 98, 99, 99.1, 99.5, or 99.9 wt. % of the metal may be in a zero oxidation state. The photocatalyst may comprise a single metal oxide and/or a single elemental metal. The photocatalyst may comprise: at least 95, 96, 97, 97.5, 98, 99, 99.1, 99.5, or 99.9 wt. % of a single metal oxide, relative to all metal oxide present in the photocatalyst; and/or at least 95, 96, 97, 97.5, 98, 99, 99.1, 99.5, or 99.9 wt. % of a single elemental metal, relative to all elemental metal present in the photocatalyst.

Aspects of the invention comprise methods of preparing a photocatalyst embedded in polymer membrane, which may include any permutation of the inventive photocatalytic material described herein. Inventive methods may comprise: (a) heating an aqueous solution comprising an acid, a metal salt, and miscible organic solvent to produce metal oxide comprising (1, 2, 3, 4, 5, or 6 of) $WO_3$, $Ce_2$, $Bi_2O_3$, NiO, $TiO_2$, and/or ZnO; (b) mixing an aqueous solution of a precursor of a metal comprising (1, 2, 3, 4, . . . 12, or 13 of) Fe, Co, Ni, Cu, Ag, Ce, Mn, Mo, V, Bi, Sn, W, Nb, Pd, and/or Pt and the metal oxide to form a mixture comprising the metal embedded in the metal oxide; (c) heating and/or calcining the mixture to form a photocatalyst; (d) blending the photocatalyst with a solution comprising a polymer in an organic solvent to form a solution and/or compounding the photocatalyst with the polymer to form a compounded melt, in a mass relationship of the photocatalyst in a range of from 0.1 to 100 wt. % of a weight of the polymer, e.g., any of these endpoints and/or at least 0.25, 0.5, 1, 2.5, 5, 7.5, 10, 12.5, 15, 17.5, 20, 25, 33, 40, 50, 60, 70, or 75 wt. % and/or up to 99, 97.5, 95, 90, 85, 80, 75, 67, 60, 55, 50, 45, 40, 33, 25, 20, 15, 10, 7.5, 5, 4, 3, 2, 1, or 0.5 wt. %; and/or (e) forming a membrane.

The heating (a) may be at a temperature in a range of from 80 to 160° C., e.g., either of these endpoints and/or at least 85, 90, 95, 100, 105, 110, 115, 120, 125, or 130° C. and/or up to 155, 150, 145, 140, 135, 130, 125, 120, 115, 110, 105, or 100° C. The heating (a) may be for a time in a range of 2 to 24 hours, e.g., either of these endpoints and/or at least 3, 4, 5, 6, 8, 10, 12, or 16 hours and/or up to 22, 20, 18, 16, 14, 12, 10, or 8 hours.

The acid in the heating (a) may comprise at least 25, 33, 50, 60, 70, 75, 80, 85, 90, 95 wt. % or more of acetic acid, relative to all acids in the mixture. Other acids which may be useful in the process may include, for example, formic acid, citric acid, tartaric acid, lactic acid, oxalic acid, malic acid, phenol, methanesulfonic acid, toluenesulfonic acid, optionally dissolved in an organic solvent, such as N,N-dimethylformamide (DMF), N,N-dimethylacetamide, N-methyl pyrrolidone (NMP), hexamethylphosphoramide (HMPA), dimethyl sulfoxide (DMSO), acetonitrile, tetrahydrofuran (THF), 1,4-dioxane, dichloromethane, chloroform, carbon tetrachloride, dichloroethane, acetone, ethyl acetate, petroleum ether, pentane, hexane(s), cyclohexane, decane(s), decalin, THF, dioxane, benzene, toluene, xylene(s), o-dichlorobenzene, diethyl ether, methyl t-butyl ether, diisopropyl ether, ethylene glycol, methanol, ethanol, isopropanol, propanol, and/or n-butanol. The organic solvent in the heating (a) may be an alcohol, such as methanol, ethanol, isopropanol, propanol, and/or butanol, though the organic solvent may adequately be an ether, such as diethyl ether, diisopropyl ether, an/or MTBE, or acetone, MEK, ethyl acetate, acetonitrile, DMF, DMSO, pentane, cyclohexane, toluene, or the like (e.g., any of those mentioned as solvents for the organic acid).

The forming (e) may comprise casting the solution or extruding the compounded melt. Injection molding and/or spin coating may be employed to form films or plates, and/or the photocatalytic material may be, for example, coated onto the inner surface of a pipe, preferably a glass or transparent material pipe, or other flat or curved substrate.

The heating (c) may comprise bringing the mixture to dryness, adding a flammable liquid, and/or igniting to form the photocatalyst. Calcining without the flammable liquid and ignition may also be employed, whereby the gas environment may be modified to ensure that the appropriate oxidation states of the metals and metal oxides are maintained or reached.

The polymer used in the may be hydrophilic and/or may comprise pores having diameters up to 2 nm, and/or any of the pore diameters described below for "microporous," as well as meso and macroporous ranges. Inventive membranes and/or polymers may have only micropores, i.e., no meso or macropores, or a mixture of these with micropores predominating according to any of the percentages described above or below.

Aspects of the invention include methods of preparing any permutation of the inventive photocatalytic material(s) described herein, the method comprising: blending the photocatalyst with a solution comprising a polymer in an organic solvent and/or compounding the photocatalyst with the polymer; and forming a membrane. The compounding of the photocatalyst and the polymer may occur in an extruder, or the materials may be mixed in solution, as desired according to the polymers used.

Aspects of the invention provide methods of inactivating at least one biological contaminant in water, the method comprising: while irradiating with a source of UV and/or visible light, contacting any permutation of the inventive photocatalytic material(s) described herein with contaminated water. The irradiation may come from an artificial light source, such as a lamp with a tailored wavelength range, e.g., at least 25, 50, 75, 100, 125, 150, 175, 200, 225, 250, 275, or 300 nm and/or up to 1000, 900, 800, 750, 700, 650, 600, 550, 500, 450, 400, 350, or 300 nm, though the light source will generally be the sun for cost and energy efficiency reasons. Aspects of the invention may include a transparent pipe through which contaminated water may pass, with inner walls coated by the photocatalytic material.

Aspects of the invention incorporate one or more photocatalysts into polymer membranes to address not only the issue of the retrieval of the photocatalyst particles, but also offer a better surface area for the photon capture. Well-dispersed photocatalyst nanoparticles as provided by aspects of the invention can achieve better activity than powders or other arrangements of the art, e.g., 2.5, 5, 7.5, 10, 15, 20, 25, or more % oxidative capacity.

Aspects of the invention include the development of sunlight active photocatalysts embedded in preferably microporous and/or hydrophilic polymer membranes to form photocatalytic materials generally suitable for removing chemical as well as biological contaminants via tertiary water purification. Aspects of the invention comprise well-dispersed and/or sunlight-active photocatalysts, preferably as nanoparticles embedded in a hydrophilic (micro)porous polymer base/matrix material. Such photocatalytic materials may address the technical issue of photocatalyst retrieval after decontamination. In addition to facilitating retrieval of the photocatalysts, and/or activity in biological decontamination, inventive materials may solve biological fouling problems in RO membranes.

Inventive catalytic materials do not require nitride or nitrogen doping to achieve peak performance. Inventive catalytic materials contain no more than 1, 0.5, 0.1, 0.01, 0.001, 0.0001, 0.00001, 0.000001, or 0.0000001 wt. %, relative to total semiconductor weight, of nitride and/or nitrogen doping.

Inventive catalytic materials directly contact the composite photocatalyst, i.e., metal oxide infused with elemental metal, with the hydrophilic polymer membrane, i.e., the metal oxide and/or the metal outer surface contacts the surface of the hydrophilic polymer membrane without any intervening layers, such as surfactants, surface modifications, graphene coatings, or the like. Inventive materials may be non-magnetic or function effectively for their intended purpose without magnetism, e.g., are retrieved without using magnetism.

Inventive catalytic materials or inventive photocatalysts generally contain may comprise no more than 15, 10, 7.5, 5, 4, 3, 2.5, 2, 1, 0.5, 0.1, 0.01, 0.001, 0.0001, or 0.00001 wt. %, relative to the total metal oxide weight, of Si, (mixed) silicon oxide(s), and/or $SiO_2$, individually or in combinations.

An aspect of the invention provides a sunlight-active photocatalyst embedded microporous hydrophilic polymer membranes which may be useful in efficiently removing chemical contaminants from water. Inventive sunlight-responsive photocatalyst nanoparticles in a hydrophilic porous polymer base material can address technical problems, such as photocatalyst retrieval after decontamination. In addition, such photocatalytic materials may be active in biological decontamination and/or address biological fouling problems in RO membranes of the art.

Aspects of the invention provide photocatalyst-embedded microporous hydrophilic polymer membranes useful in single-step removal of dissolved ions, chemical contaminants, and biological contaminants from water, under exposure to sunlight, without leaving any toxic (to humans and/or fish) by-products.

The term "hydrophilic polymer" as used herein refers to polymer having affinity for water molecules. Examples of such hydrophilic polymers may include those mentioned above and below, e.g., cellulose acetate, polyether sulfone, polysulfone, and/or polyvinylidene difluoride (PVDF), as well as commercially available or otherwise known polymers, copolymer, terpolymers, and the like, for example:

maleic anhydride copolymers, such as poly(ethylene-alt-maleic anhydride), e.g., Mw 100,000-500,000, poly(methyl vinyl ether-alt-maleic acid), e.g., Mw~216,000 by LS, Mn~80,000 or Mw~1,980,000 by LS, Mn~960,000, poly(methyl vinyl ether-alt-maleic acid monoethyl ester), e.g., Mw~130,000 by LS, poly(methyl vinyl ether-alt-maleic anhydride), e.g., Mw~216,000, Mn ~80,000 or Mw~1,080,000, Mn ~311,000, poly(styrene-alt-maleic acid), optionally as $Na^+$, $K^+$, $^+NH_4$, etc. salt, poly(4-styrenesulfonic acid-co-maleic acid), optionally as $Na^+$, $K^+$, $^+NH_4$, etc. salt, e.g., Mw~20,000;

polyethers, such as poly(methyl vinyl ether), poly(methyl vinyl ether-alt-maleic acid), e.g., Mw~216,000, Mn ~80,000 or Mw~1,980,000, Mn ~960,000, poly(methyl vinyl ether-alt-maleic acid monoethyl ester), e.g., Mw~130,000 by LS, poly(methyl vinyl ether-alt-maleic anhydride), e.g., Mw~216,000, ~80,000, or ~1,080,000, Mn ~311,000, glycerol propoxylate, polyepoxysuccinic acid, poly ethylene oxide, poly propylene oxide, etc.;

poly(N-isopropylacrylamide) (PNIPAM) and copolymers, such as poly(N-isopropylacrylamide), e.g., Mn 10,000 or 30,000 or ~40,000 or 85,000, poly(N-isopropylacrylamide-co-butylacrylate) butylacrylate, e.g., Mn 30,000, poly(N-isopropylacrylamide-co-methacrylic acid) methacrylic acid, i.e., poly(NIPAM-co-MAA), e.g., Mn 8,000-10,000 or Mn 50,000 or Mn 60,000, poly(N-isopropylacrylamide-co-acrylic acid), i.e., poly(NIPAM-co-AA), poly(N-isopropylacrylamide-co-acrylamide), i.e., poly(NIPAM-co-AM), e.g., Mn 20,000, poly(N-isopropylacrylamide-co-methacrylic acid-co-octadecyl acrylate), i.e., poly(NIPAM-co-MAA-co-ODA), e.g., Mn 30,000-60,000, poly(NIPAM-co-methylacryl succinimide), poly(N-isopropyl acrylamide-co-(N-methacryloxysuccinimide)), e.g., Mn 5,000, poly(N-isopropyl acylamide-co-3-(trimethoxysilyl)propyl methacrylate), i.e., poly(NIPAM-co-3-TMS-propyl methacrylate), e.g., Mn 10000, poly(NIPAM-b-PEG) poly(ethylene glycol)-block-poly(N-isopropylacrylamide), PEG Mn 2,000, PNIPAM, e.g., Mn 24,000, e.g., PDI<1.2;

polyacrylamide (PAM) and copolymers, such as poly(acrylamide), e.g., Mn 150,000, poly(2-acrylamido-2-methyl-1-propanesulfonic acid), e.g., Mw 2,000,000, poly(N,N-dimethylacrylamide), e.g., Mn 10,000, PDI≤1.1, poly(acrylamide-co-acrylic acid), optionally as $Na^+$, $K^+$, $^+NH_4$, etc. salt, e.g., Mw 520,000, Mn 150,000, poly(acrylamide-co-diallyldimethylammonium chloride), poly(2-acrylamido-2-methyl-1-propanesulfonic acid-co-acrylonitrile);

poly(2-oxazoline)s, such as poly(2-ethyl-2-oxazoline), e.g., Mn 5,000, PDI≤1.3, Mn 10,000, PDI≤1.3, Mn 25,000, PDI≤1.4, Mn 50,000, PDI≤1.25, Mw~50,000, PDI 3-4, Mw~200,000, PDI 3-4, Mw~500,000, PDI 3-4;

polyethylenimine (PEI)s, such as polyethylenimine, e.g., HBr or HCl linear, e.g., Mn 4,000, PDI≤1.1, Mn 10,000, PDI≤1.3, Mn 20,000, PDI≤1.2, polyethylenimine, linear, e.g., Mn 2,500, PDI<1.2, Mn 5,000, PDI≤1.3, Mn 10,000, PDI≤1.2, poly(ethyleneimine), branched, e.g., Mn~1,800 by GPC, Mw~2,000 or Mn~1,200, Mw~1300 or Mn ~60,000, Mw~750,000, polyethylenimine, 80% ethoxylated, polyethylenimine, branched, e.g., Mw~800, Mn~600 or Mw~25,000, Mn ~10,000, stearic acid-modified branched polyethylenimine, branched PEI-g-PEG, e.g., PEG Mn 5,000 or PEG Mn 550;

poly(acrylic acid)s, such as poly(acrylic acid), e.g., Mv~450,000, Mv~1,250,000, Mv~3,000,000, Mv~4,000,000, poly(acrylic acid), e.g., Mw~2,000, Mw~100,000, Mw~250,000, poly(acrylic acid), optionally as partial $Na^+$, $K^+$, $^+NH_4$, etc. salt, poly(acrylic acid-co-maleic acid), e.g., Mw 3,000, cross-linked Na polyacrylate;

polymethacrylates, such as poly(methacrylic acid), optionally $Na^+$, $K^+$, $^+NH_4$, etc. salt, e.g., Mw 4,000-6,000 or Mn ~5,400, Mw~9,500, poly(N-isopropylacrylamide-co-methacrylic acid), e.g., Mn 8,000-10,000, Mn 50,000, Mn 60,000, poly(N-isopropylacrylamide-co-methacrylic acid-co-octadecyl acrylate), e.g., Mn 30,000-60,000, poly(2-hydroxypropyl methacrylate), e.g., My 20,000, My 300,000, My 1,000,000, poly(2-dimethylamino)ethyl methacrylate) methyl chloride quaternary salt, poly[(2-ethyldimethylammonioethyl methacrylate ethyl sulfate)-co-(1-vinylpyrrolidone)], e.g., Mw<1,000,000, poly(hydroxyethyl methacrylate), e.g., Mn 7,000, PDI<1.2, poly(1-vinylpyrrolidone-co-2-dimethylaminoethyl methacrylate), e.g., Mw~1,000,000;

other acrylic polymers, such as poly(tert-butyl acrylate), e.g., Mn 8,500, PDI≤1.2 or Mn 7,000, poly(2-ethylacrylic acid), poly(N-isopropylacrylamide), e.g., Mn 30,000, poly (2-propylacrylic acid), e.g., Mn 20,000-80,000 or Mn ~100,000, poly(sulfopropyl acrylate), optionally as $Na^+$, $K^+$, $^+NH_4$, etc. salt, e.g., Mn 200,000 poly(vinyl alcohol) (PVA) and copolymers, such as poly (vinyl alcohol) (PVA), e.g., Mw~27,000, ~31,000, ~47,000, ~67,000, ~61,000, ~125,000, ~130,000, ~145,000, ~195,000, ~205,000, poly(vinyl alcohol), e.g., Mw 89,000-98,000, 85,000-124,000, 130,000, 146,000-186,000, 31,000-50,000, 13,000-23,000, 13,000-23,000, 31,000-50,000, 85,000-124,000, 146,000-186,000, 9,000-10,000, optionally 99+%, 87-89%, or 80% hydrolyzed, poly(vinyl alcohol-co-ethylene) ethylene 20, 22, 25, 27, 28, 30, or 32 mol. %;

poly(vinylpyrrolidone)s (PVP) and copolymers, such as polyvinylpyrrolidone, e.g., Mw 10,000 or 40,000 or 360,000 or Mw~29,000 or ~55,000 or ~1,300,000, poly(1-vinylpyrrolidone-co-2-dimethylaminoethyl methacrylate), e.g., Mw~1,000,000, poly(1-vinylpyrrolidone-co-styrene), poly (1-vinylpyrrolidone)-graft-(1-triacontene), poly(1-vinylpyrrolidone-co-vinyl acetate), e.g., Mw~50,000 or ~13,000;

poly(vinyl acid) polymers, such as poly(vinylphosphonic acid), poly(vinyl sulfate), optionally as $Na^+$, $K^+$, $^+NH_4$, etc. salt, e.g., Mw~170,000, poly(vinylsulfonic acid), optionally as $Na^+$, $K^+$, $^+NH_4$, etc. salt; and poly(styrenesulfonate) (PSS) and copolymers, such as poly(styrenesulfonate) (PSS), polyanetholsulfonic acid, optionally as $Na^+$, $K^+$, $^+NH_4$, etc. salt, poly(sodium 4-styrenesulfonate), e.g., Mw~70,000 or ~1,000,000 or ~200,000 or ~75,000, poly(4-styrenesulfonic acid-co-maleic acid), $Na^+$, $K^+$, $^+NH_4$, etc. salt, Mw~20,000. Further polymers for consideration may include methylated, ethylated, or acetylated chitosans, methylated, ethylated, or acetylated cellulose, organic acid esters of cellulose, such as cellulose acetate (CA), cellulose acetate propionate (CAP), and cellulose acetate butyrate, (CAB).

Depending upon the application, useful polymer Mw may be at least 2.5, 5, 7.5, 10, 12.5, 15, 17.5, 20, 25, 30, 35, 40, 45, 50, 65, 75, 85, 100, 125, 150, 175, 200, or 250 kDa and/or up to 2500, 2000, 1750, 1500, 1250, 1000, 900, 800, 750, 700, 650, 600, 550, 500, 400, 300, 200, 175, 150, 125, 100, 90, 80, 75, 65, 60, 55, or 50 kDa. Relevant PDIs will vary depending upon application, but will generally be in a range of at least 1.05, 1.1, 1.15, 1.25, 1.33, 1.4, 1.5, 1.75, 2, or 2.5 and/or up to 10, 9, 8, 7, 6, 5, 4, 3, 2.5, 2.25, 2, 1.75, or 1.5.

The term "microporous" as used herein refers to the pores of micrometer size, i.e., pore diameters less than 2 nm, e.g., down to 0.001, 0.005, 0.01, 0.025, 0.05, 0.1, 0.2, 0.25, 0.3, 0.33, 0.35, 0.4, 0.45, 0.5, 0.55, 0.6, 0.67, 0.75, 0.85, 0.95, 1, 1.1, 1.2, 1.25, or 1.5 nm and/or no more than 2, 1.95, 1.9, 1.85, 1.8, 1.75, 1.67, 1.6, 1.5, 1.4, 1.33, 1.25, 1.2, 1.1, 1, 0.95, 0.9, 0.85, 0.8, 0.75, 0.67, or 0.5 nm, as compared to mesoporous materials having pore diameters within a range of from 2 nm and 50 nm, e.g., at least 2, 2.5, 3.33, 5, 6, 6.67, 7.5, 8.5, 10, 12.5, 15, 17.5, 20, 22.5, or 25 nm and/or up to 50, 47.5, 45, 42.5, 40, 37.5, 35, 33.3, 32.5, 30, 27.5, 25, 22.5, or 20 nm, or macroporous materials having pore diameters of greater than 50 nm, e.g., at least 52.5, 55, 57.5, 60, 62.5, 65, 66.7, 70, 75, 85, 100, 125, 150, 175, 200, 250, 375, or 500 nm but generally not more than 250, 200, 150, 100, 50, 25, 10, 5, or even 1 μm. The pore distributions may be Gaussian, monomodal, bimodal, trimodal, tetramodal, or more.

The term "photocatalyst" as used herein refers to a powder comprising or consisting essentially of a metalloid and/or metal oxide, generally a semiconductor, capable of generating a chemical reaction upon the absorption of photons of a suitable energy, typically matching with the bandgap of the metalloid and/or metal oxide.

The term "chemical contaminants" herein refers to organic molecules present in water through human, livestock, and/or industrial activity, which molecules may be hazardous to human and/or animal life. Such chemical contaminants may include aliphatic and aromatic water-soluble compounds, such as phenolic compounds and dyes comprising phenols. The term "biological contaminants" herein refers to proteins, enzymes, nucleotide sequences, prions, viruses, phages, and/or bacteria, the presence of which in water may be hazardous to human or animal life.

General Photocatalyst-Embedded Membrane Synthetic Protocol

The two-component, i.e., Component I and Component II, photocatalyst-containing polymer membranes were synthesized by first dispersing the photocatalyst in a dissolved-polymer solution. The suspension, comprising the polymer solution and the photocatalyst(s), was then cast in the form of membrane with a thickness ranging between 100 to 500 μm, e.g., either of these endpoints and/or at least 110, 125, 150, 175, 200, 225, 250, 275, or 300 μm and/or up to 475, 450, 425, 400, 375, 350, 333, 325, 300, 275, 250, 225, or 200 μm.

General Photocatalyst Synthetic Protocol

The photocatalyst, i.e., Component I, was synthesized in two-step procedure. In the first step, the base material of Component I—which is generally a semiconductor—was synthesized from a hydrated gel or using a hydrothermal procedure. The base material may include, but is not limited to, $WO_3$, $CeO_2$, $Bi_2O_3$, NiO, $TiO_2$, and ZnO.

In the second step, the base material was modified for (generally) better activity and/or spectral response by transition and/or non-transition metal(s) impregnation or composite formation. The metals may include, but are not limited to, Fe, Co, Ni, Cu, Ag, Ce, Mn, Mo, V, Bi, Sn, W, Nb, Pd, and/or Pt. The loading of the transition/non-transition metals on the (semiconductor) base material may range from, for example, 0.1 to 50 wt. %, relative to total composite or photocatalyst weight, e.g., any of these endpoints and/or at least 0.25, 0.5, 1, 2.5, 5, 7.5, 10, 15, 20, or 25 wt. % and/or up to 45, 40, 35, 30, 25, 20, 15, 12.5, 10, 7.5, or 5 wt. %.

The polymer, i.e., Component II, can be dissolved in the suitable solvent, such as, acetone, methyl ethyl ketone, ethanol, methanol, diethyl ether, diisopropyl ether, ethyl acetate, DMF, and THF. The polymer may include, for example, cellulose acetate, polyether sulfone, polysulfone, and/or polyvinylidene difluoride (PVDF). The dissolved polymer can be mixed with the dispersed Component I and subjected to membrane formation. Component I may range in an amount of from 0.1 to 100 wt. % (i.e., 1:1), relative to the weight of the polymer.

The photocatalytic degradation process in water proceeds with the absorption of light having energy higher than or equal to the bandgap, by the photocatalyst present in a liquid (e.g., aqueous) suspension comprising the chemical contaminant(s). The absorbed photons induce the excitation of valence band (VB) electrons to the conduction band (CB), thus generating the oxidation and reduction sites in terms of a photogenerated electron-hole pair at the surface of the photocatalyst.

Depending on the band edge positions, the photogenerated holes ($h_{vb}^+$) may split the adsorbed water molecules and generate oxidizing hydroxyl radicals, while the photogenerated electrons ($e^-$) serve as reduction site for the adsorbed oxygen and produce highly oxidizing superoxide radicals. These oxidizing species, produced in a cascade, interact with the (chemical) contaminants and results in partial to complete oxidation, degradation, and/or mineralization.

Oxidation Testing

The performance of the photocatalysts embedded membranes was evaluated for the complete removal/mineralization of a variety of contaminants that included colorants/dyes (e.g., anionic, cationic, azo, diazo, etc.), phenols (bis, chloro, nitro, etc.) under natural sunlight exposure in a Pyrex glass reactor. The embedded membranes were suspended 10 to 1000 mL of aqueous solution containing 1 to 1000 ppm of chemical contaminants.

During the exposure to sunlight, samples were analyzed at regular intervals to monitor the progress of photocatalytic process. The samples were analyzed by UV-Visible spectrophotometer, High-Performance Liquid Chromatography (HPLC), Total Organic Carbon (TOC) analysis, and Ion Chromatography (IC).

The activity of the membranes for the removal of biological contaminants was also examined. Aspects of the invention can provide: (1) simultaneous removal of contaminants in a reverse osmosis (RO) process; (2) facile retrievability of the photocatalysts after decontamination; and/or (3) reducing or eliminating biological fouling of reverse osmosis (RO) membranes during purification.

Example 1

Synthesis of Base Material ($ZnO/WO_3/CeO_2/Bi_2O_3$): The base materials were synthesized by hydrothermal route where the precursor materials were subjected to heat treatment in a stainless steel vessel. The precursors were dissolved in the aqueous mixtures of ultrapure distilled water and ethanol in the ratio of 10:1 (v/v). Afterwards, 50 ml of potassium hydroxide or hydrazine or $NH_4OH$ solution were added dropwise under constant stirring. Finally the solution were transferred to autoclave and kept at an elevated temperature of more than 120° C. for a period of 24 hr. The obtained precipitate was separated and washed several times with distilled water and ethanol and dried at 100° C. Lastly, the metal oxide powder was grinded and calcined overnight at a temperature of 500° C. with the heating and cooling rate of 10° C. per minute. The SEM images showing the morphology of the representative base materials are presented in FIG. 2.

Example 2

Synthesis of Modified Composite Photocatalysts: A weight percentage of transition/non-transition metal ion precursors, but not limited to 0.01 wt % to 50 wt %, was dissolved in deionized water in the presence of surfactant and hydrolyzed with a stoichiometric amount of a suitable hydroxide until complete hydrolysis. The appropriate amount of the base material from Example 1 was added to the hydrolyzed suspension and stirred overnight to obtain a slurry. The resulting slurry was filtered, washed until a neutral pH was reached, dried at 100° C. overnight, and calcined at 500° C. for six hours. The characterization of the composite photocatalysts was carried out by UV-visible diffuse reflectance spectroscopy (DRS), photoluminescence spectroscopy (PLS), x-ray Diffraction analysis (XRD) and field emission scanning electron microscopy (FE-SEM). The FE-SEM images of some representative composite materials are presented in FIG. 3.

Example 3

Synthesis of Modified Impregnated Photocatalysts: Impregnated photocatalysts were synthesized by auto-combustion, in which the appropriate amount, but not limited to 0.01 wt % to 50 wt %, of transition/non-transition metal ion precursor was dissolved in the deionized water and added the appropriate amount of the base material synthesized in Example 1. The slurry was heated until the complete evaporation of the water and subsequently the addition of ethanol initiate the strong self-combustion. The combustion resulted in a residual powder with the $NO_x$ gases removed. The isolated residual powder was ground and calcined at 500° C. for six hours to obtain a powder. The powders obtained were characterized by UV-visible DRS, PLS, XRD, and FE-SEM. The FE-SEM images of the represented impregnated materials are presented in FIG. 4.

Example 4

Synthesis of Cellulose Acetate Membranes with Embedded Photocatalysts: The appropriate precursor, but not limited to, 0.1 g to 1 g of photocatalyst, was added to a solution of cellulose acetate dissolved in acetone at ambient temperature and pressure with constant magnetic stirring for the preparation of various composition of cellulose acetate/photocatalyst embedded membranes, but not limited to, 100/0 to 100/10 CA/photocatalyst weight ratios. Potential coagulation of the photocatalyst particles was avoided by prior stirring in ethanol for prolonged period at ambient temperature. The dispersed photocatalyst solution was added to the cellulose acetate/acetone solution with continuous stirring for five hours at 60° C. The photocatalyst particles were distributed in the matrix of cellulose acetate by ultrasonication. The well-dispersed suspension was spread and cast on a glass substrate with a mechanical casting rod to a thickness of 250 µm. After 90 seconds, the membrane was immersed in a coagulation bath having non-solvent (deionized water). The membranes were detached from the glass support and rinsed three times with fresh ultrapure water and air-dried at ambient temperature. The membranes synthesized were characterized by UV-visible DRS, PLS, XRD, and FE-SEM. The FE-SEM images of the represented coated materials are presented in FIG. 5.

Example 5

Photocatalytic Degradation of Chemical Contaminants: The photocatalytic performance of the photocatalyst embedded membrane developed in Example 4 was evaluated for the removal of a variety of potential water-soluble pollutants, such as dyes and phenol derivatives, was estimated in the natural sunlight exposure. In a typical experiment, the piece of the photocatalyst-embedded membrane, compatible with the diameter (155 mm) of the flat surface of a PYREX® reactor, was immobilized at the base. The reactor was filled with 100 cm³ of 50 ppm of contaminant solution and placed in the dark for 30 minutes to maintain the equilibrium between the membrane and solution. The membrane and the contaminant solution was exposed to natural sunlight, sampling at regular intervals for analysis by UV-visible spectroscopy, HPLC, IC, and TOC measurements. The experiments were performed in natural environment without stirring and without temperature control. The effect of the angle of the incident photons was also evaluated. Time-scaled HPLC chromatograms elaborating the removal of chlorophenols and nitrophenols by various membranes are presented in FIG. 6.

Example 6

Photocatalytic Degradation of Biological Contaminants: The antimicrobial activity of the photocatalyst-embedded membranes developed in Example 4 were evaluated for the deactivation of biological contaminants under natural sunlight exposure. In a typical experiment, the membrane of the appropriate size was immobilized at the base of reactor containing 100 cm³ of the pre-filtered sewage water. In parallel, a control setup was prepared without the embedded membrane. Both suspensions were exposed to sunlight and samples were collected and analyzed over time for total bacterial count using the spread plate technique in which 1.0 cm³ of sample was dispersed on the surface of nutrient agar plates. The plates were incubated for overnight at a constant temperature of 37° C., and the bacterial colonies formed were counted. The efficiency of various membranes for the removal of biological contaminants is presented in FIG. 7.

Inventive photocatalytic materials are generally active under exposure to sunlight and/or stable in ambient/natural environments. Inventive photocatalytic materials may be suitable to mineralize phenolic compounds, including chlorophenols, bromophenols, bisphenol(s), nitrophenols, etc., as well as to eliminate biological contaminants. Inventive photocatalytic materials may be resistant against biological fouling.

Advantages of the inventive photocatalysts can include: a simple route for the fabrication of photocatalyst embedded membranes; non-toxic component composition; water insolubility; simultaneous desalination and decontamination; regeneration in sunlight; minimum fouling; limited to no deactivation after successive use; facilitated photocatalyst removal from the treated water/liquid; activity in sunlight; activity across a wide temperature range; substantial to complete mineralization of harmful contaminants; and/or nontoxic by-products.

Referring now to the drawings, wherein like reference numerals designate identical or corresponding parts throughout the several views.

FIG. 1 shows a schematic diagram of an exemplary photocatalytic decontamination process within the scope of the invention, wherein the photocatalyst action in the aqueous medium against the chemical and biological contaminants after the absorption of sunlight is portrayed. As is seen, an oxygen source may be used, and the oxygen source could be a purified gas, e.g., at least 50, 60, 70, 75, 80, 85, 90, or 95 mol. % $O_2$, or simply atmospheric oxygen. The purification with oxygen tanks may be best performed in plants, though ambient sunlight and oxygen sources could be used in pipelines away from other infrastructure.

FIG. 2A to 2D show field emission scanning electron microscope (FE-SEM) images, respectively illustrating the morphology of ZnO (prismic and/or rod-shaped), $CeO_2$ (flocculent granular or cauliflower-like), $WO_3$, (flake or plate-shaped), and $Bi_2O_3$ (pyramidal and/or triangular pyramids and plates).

Figure 3A:
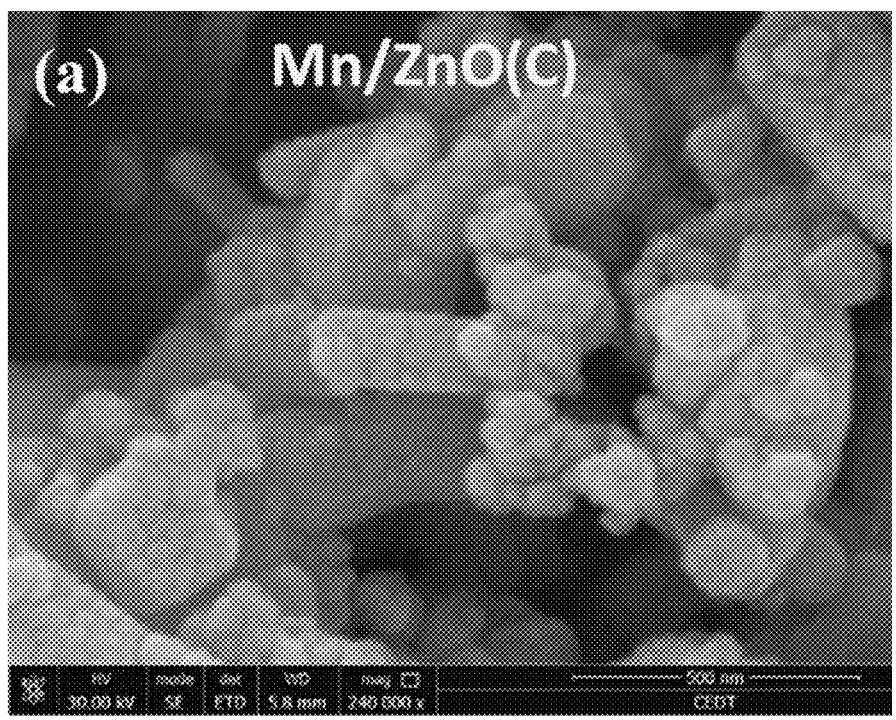
FIG. 3A shows an FE-SEM image of a representative composite material, Mn/ZnO.
Figure 3B:
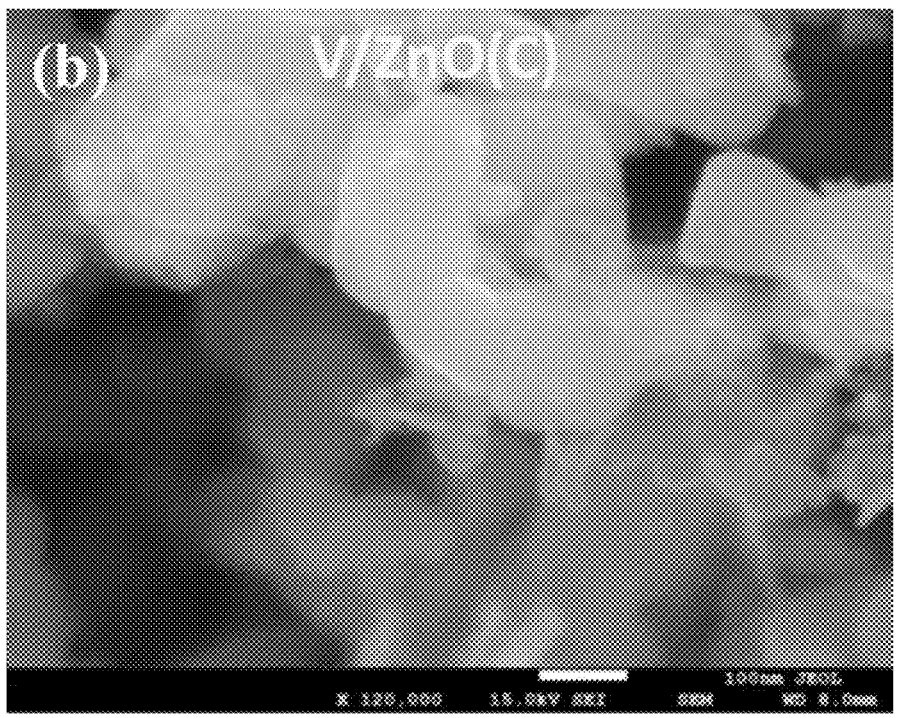
FIG. 3B shows an FE-SEM image of a representative composite material, V/ZnO.
Figure 3C:
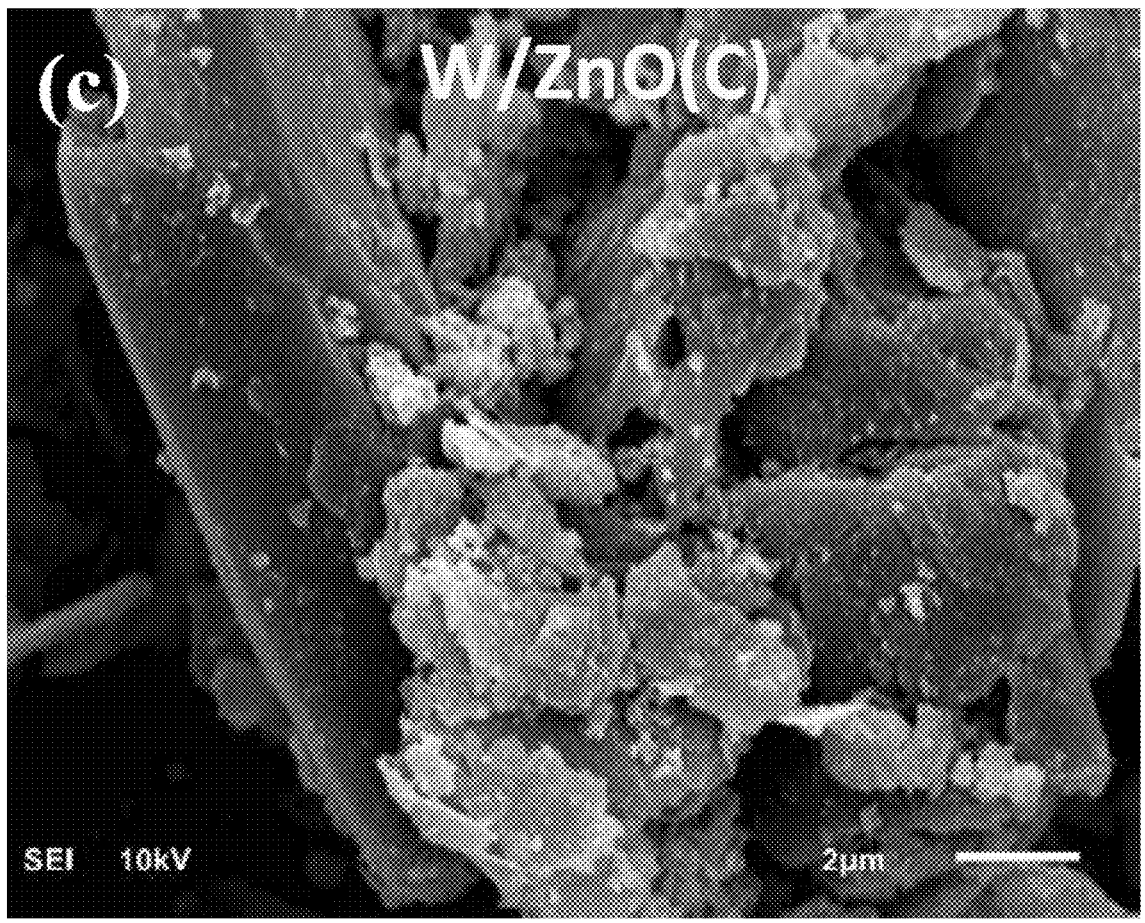
FIG. 3C shows an FE-SEM image of a representative composite material, W/ZnO.

FIG. 3A to 3C show FE-SEM images of representative composite materials, respectively, Mn/ZnO, V/ZnO, and W/ZnO. FIG. 3A shows a morphology of a base irregular prism with cauliflower-like blistering on the surfaces, including aggregations of rounded structures. FIG. 3B shows similar irregular appearing prismic base structures, similar to FIG. 3A, with rounded but relatively slightly more orthogonally extended protrusions from the surfaces of the base prisms, as well as somewhat less dense clusters on the surfaces of the base prisms. FIG. 3C shows prismic and plate-like base elements with flaky deposits on the surface, which may be a stacking of plate-like shapes, decreasing in area in a visual direction away from the bulk of the material.

Figure 4A:
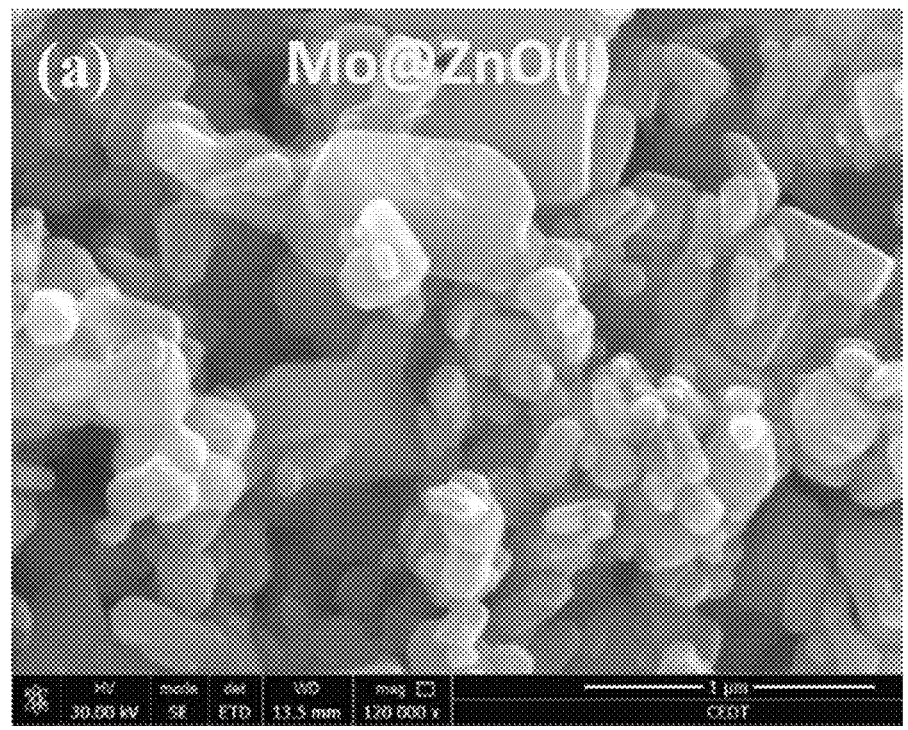
FIG. 4A shows an FE-SEM image of a representative impregnated material, Mo@OZnO.
Figure 4B:
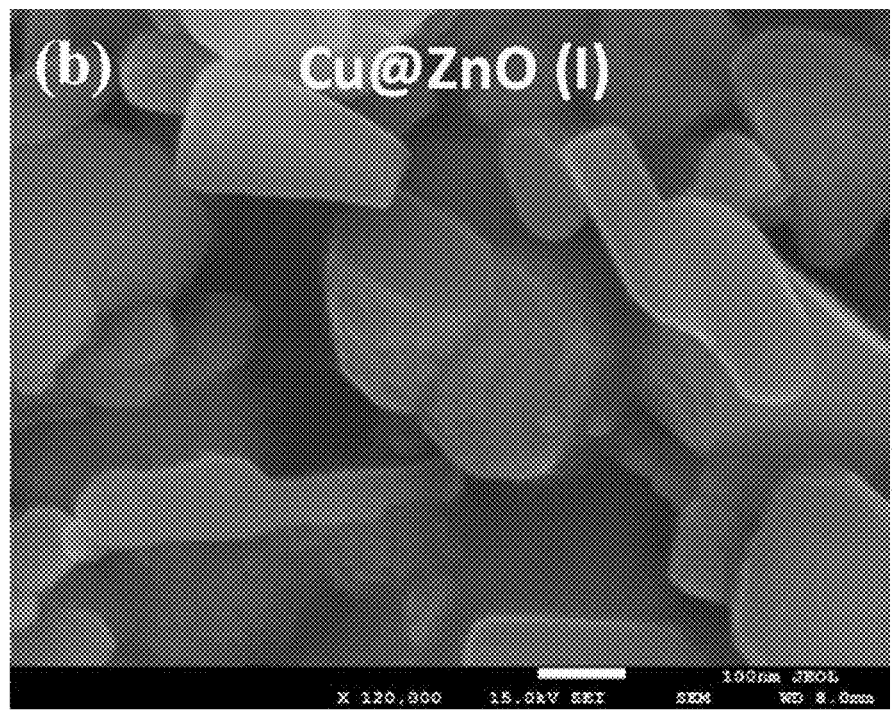
FIG. 4B shows an FE-SEM image of a representative impregnated material, Cu@ZnO.
Figure 4C:
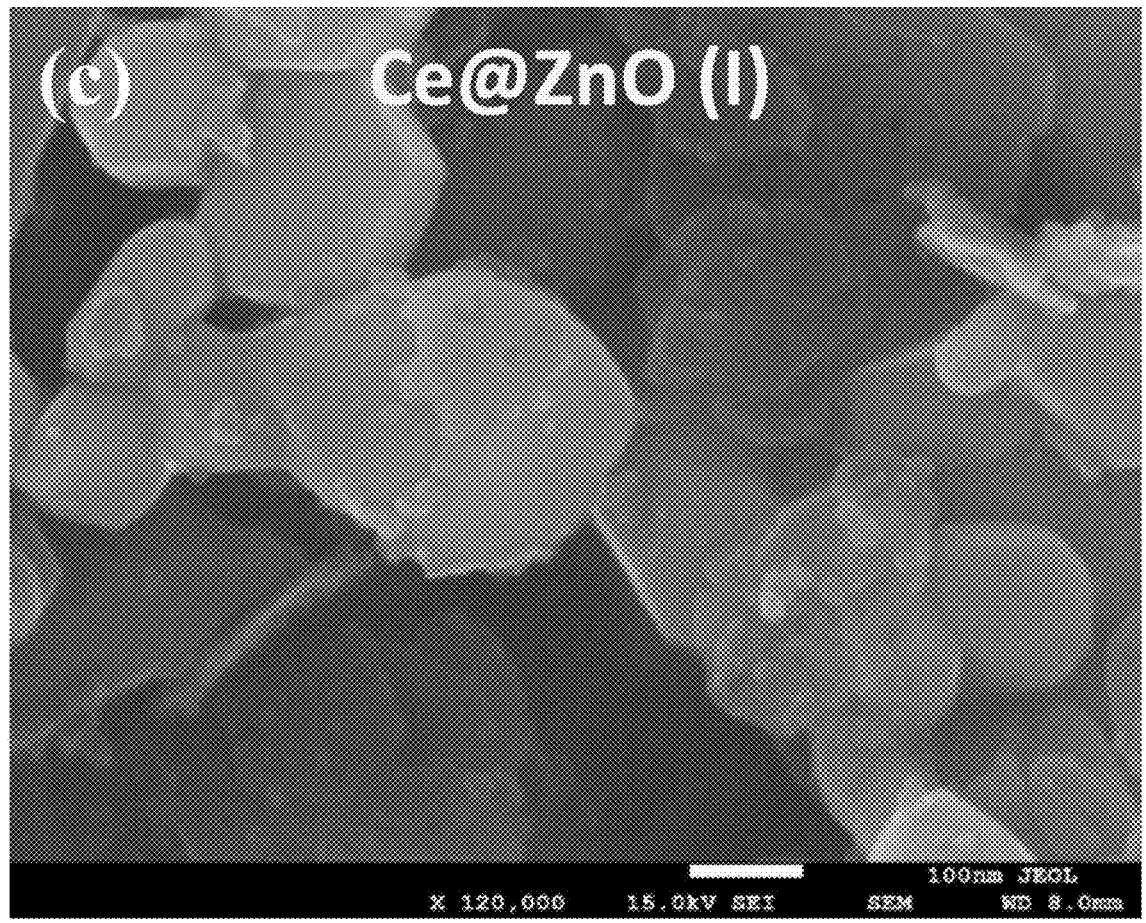
FIG. 4C shows an FE-SEM image of a representative impregnated material, Ce@ZnO.

FIG. 4A to 4C show FE-SEM images of representative impregnated materials, respectively Mo@OZnO, Cu@ZnO, and Ce@OZnO, which show rounded, generally square prismic structures, particularly for Mo(ZnO, and less regular and/or more conically shaped prisms for Cu@ZnO, and including pentagonal and/or hexagonal cross-section squat prisms for Ce@OZnO.

Figure 5A:
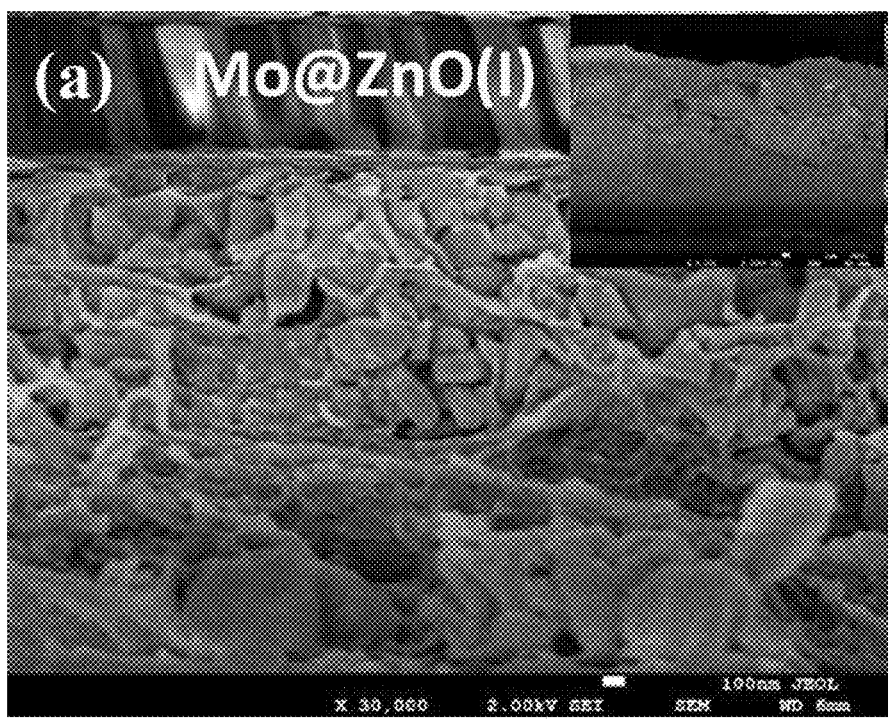
FIG. 5A shows a cross-sectional FE-SEM image of a representative Mo@ZnO photocatalyst embedded microporous membrane, with the inset showing the membrane cross-section at lower magnification.
Figure 5B:
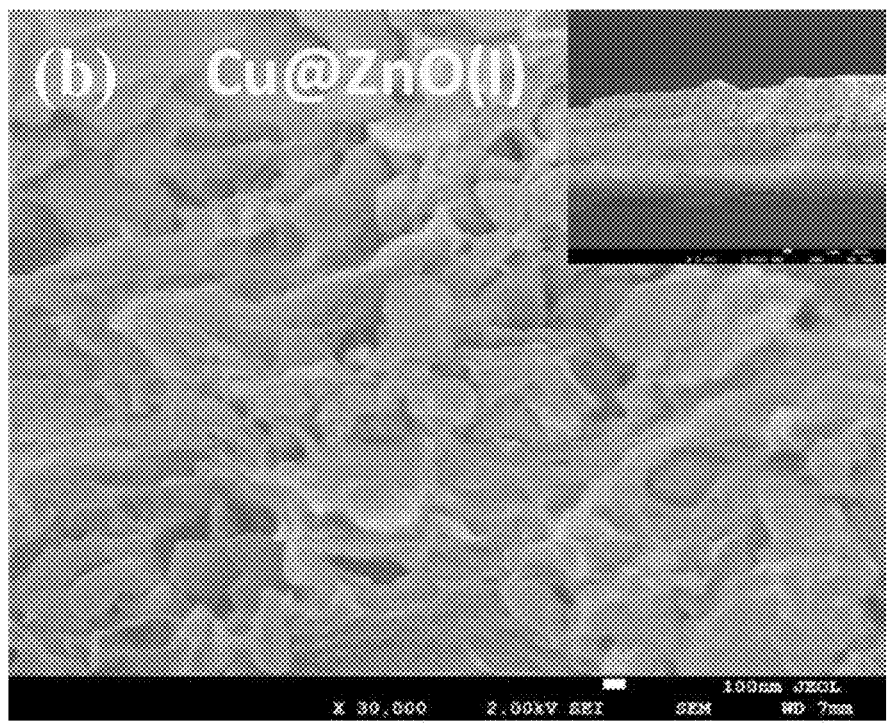
FIG. 5B shows a cross-sectional FE-SEM image of a representative Cu@ZnO photocatalyst embedded microporous membrane including, with the inset showing the membrane cross-section at lower magnification.
Figure 5C:
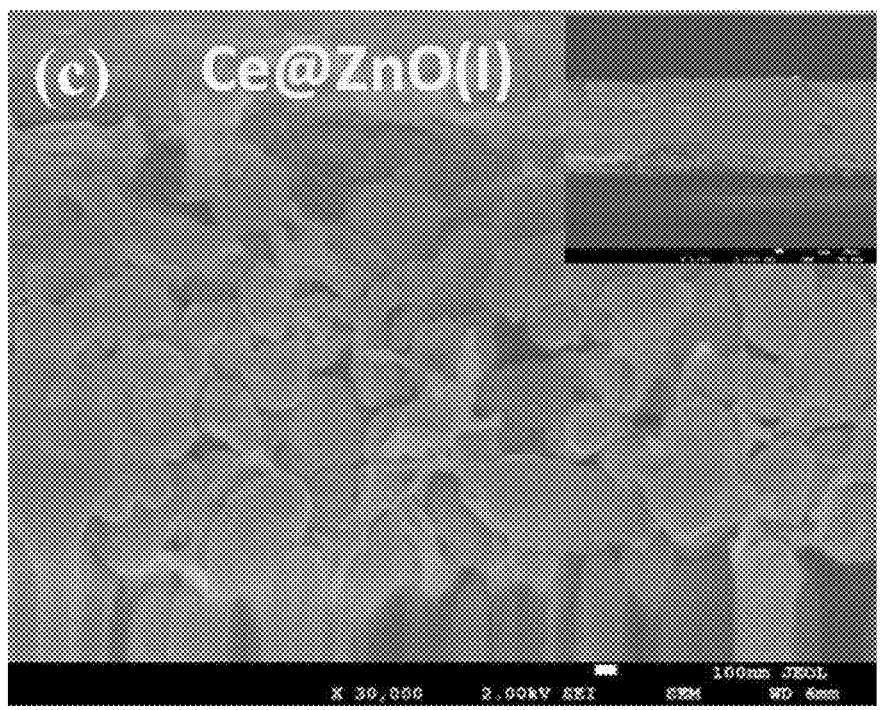
FIG. 5C shows a cross-sectional FE-SEM image of a representative Ce@ZnO photocatalyst embedded microporous membrane, with the inset showing the membrane cross-section at lower magnification.
Figure 5D:
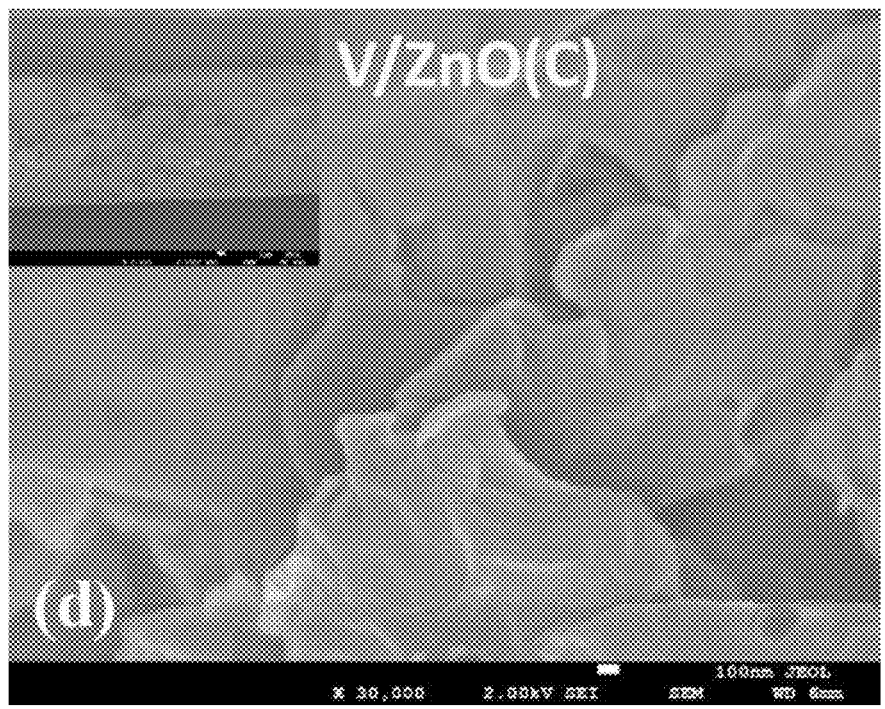
FIG. 5D shows a cross-sectional FE-SEM image of a representative V/ZnO photocatalyst embedded microporous membrane, with the inset showing the membrane cross-section at lower magnification.
Figure 5E:
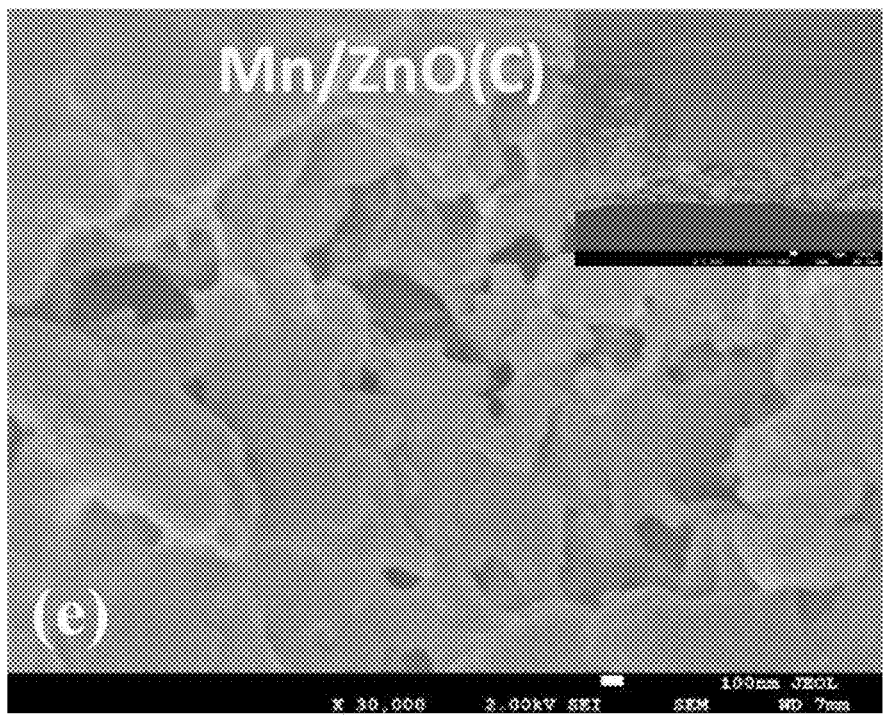
FIG. 5E shows a cross-sectional FE-SEM image of a representative Mn/ZnO photocatalyst embedded microporous membrane, with the inset showing the membrane cross-section at lower magnification.
Figure 5F:
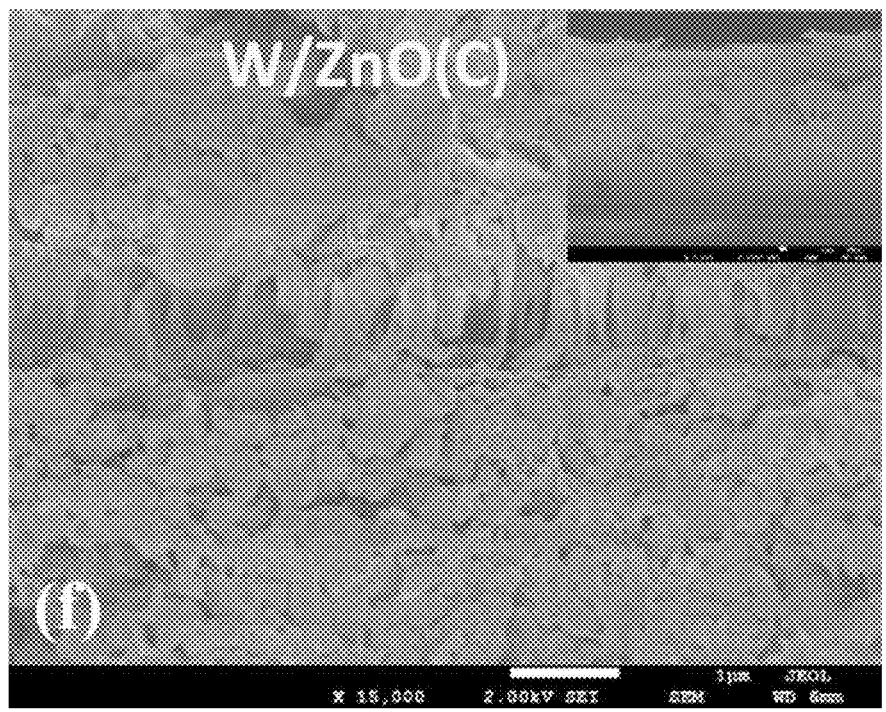
FIG. 5F shows a cross-sectional FE-SEM image of a representative W/ZnO photocatalyst embedded microporous membrane, with the inset showing the membrane cross-section at lower magnification.

FIG. 5A to 5F show cross-sectional FE-SEM images (100 nm scale) with lower magnification insets, respectively of representative Mo(@ZnO, Cu@ZnO, Ce@OZnO, V/ZnO, Mn/ZnO, or W/ZnO photocatalyst embedded microporous membrane. The Mo@ZnO sample in FIG. 5A, relative to the exemplified materials in FIG. 5A to 5F, shows the most prominent inter-crystalline spacing between the stacked pseudo-prismic morphologies. The Cu@OZnO sample in FIG. 5B shows irregular rough packing including relatively long, ridge-like morphologies and smaller rounded elements interspersed arbitrarily. The Ce@OZnO sample in FIG. 5C shows rounded, compressed circular features, somewhat like the appearance of concentrated blood platelets. FIGS. 5D and 5E respectively show irregular flake-like plating, with Mn/ZnO (FIG. 5D) having smaller features than V/ZnO (FIG. 5E). The W/ZnO sample in FIG. 5F shows a similar morphology to Cu@ZnO, but without the long, ridge-like morphologies and with more, and smaller, rounded elements closely stacked.

Figure 6A:
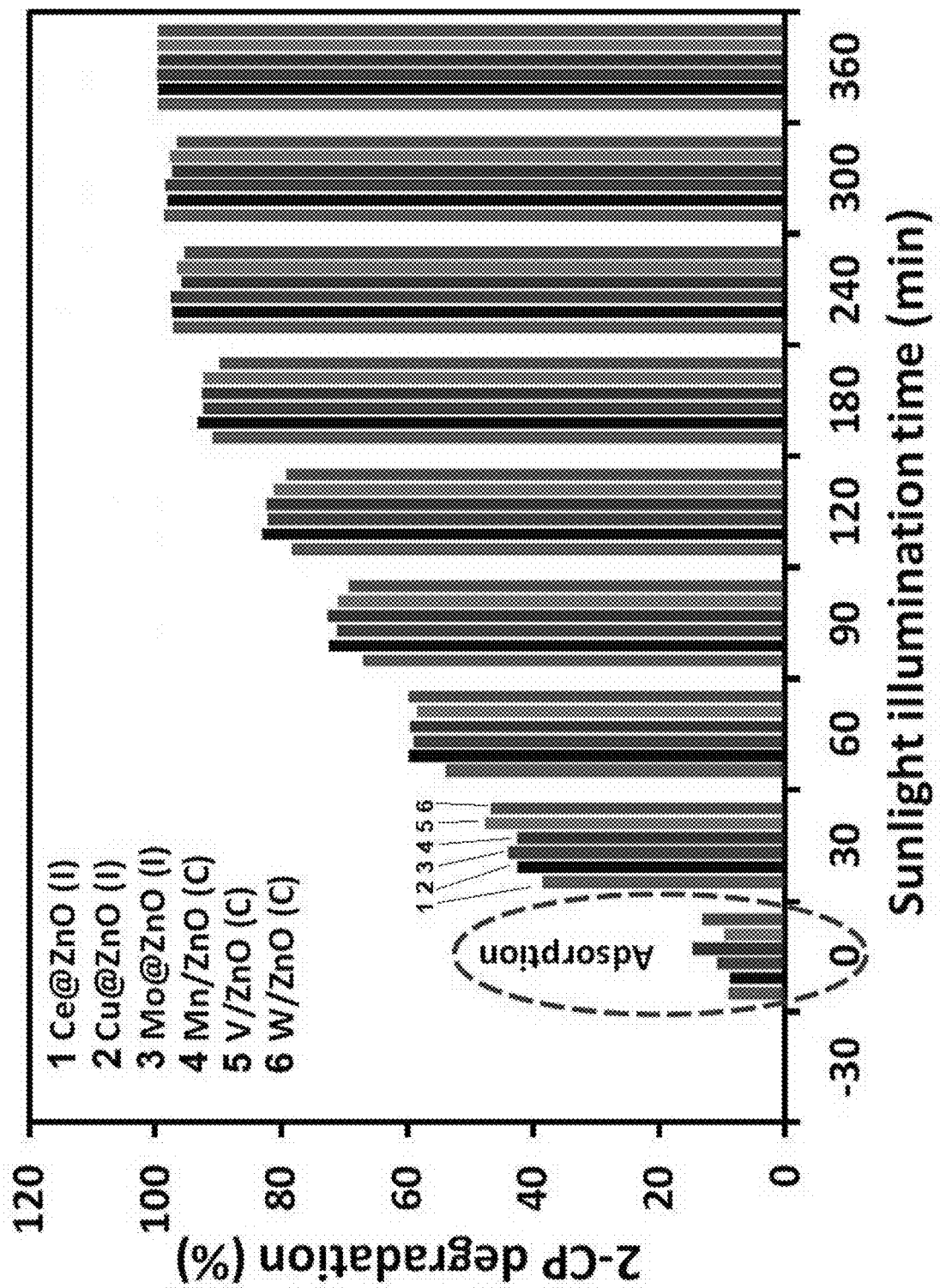
FIG. 6A shows a bar graph charting the removal of 2-chlorophenol over time under natural sunlight exposure in the presence of the photocatalytic materials depicted in FIG. 5A to 5F.
Figure 6B:
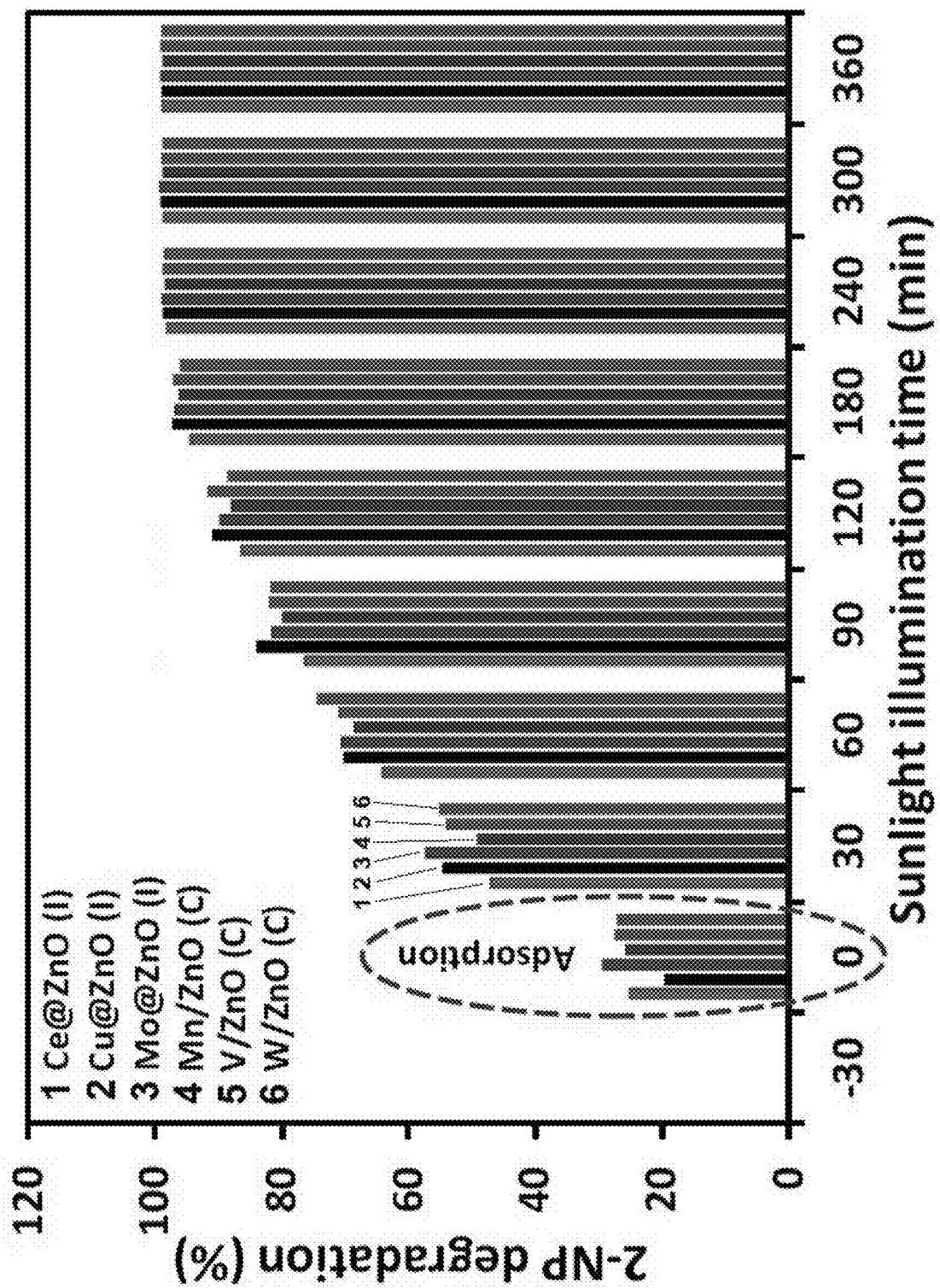
FIG. 6B shows a bar graph charting the removal of 3-chlorophenol over time under natural sunlight exposure in the presence of the photocatalytic materials depicted in FIG. 5A to 5F.
Figure 6C:
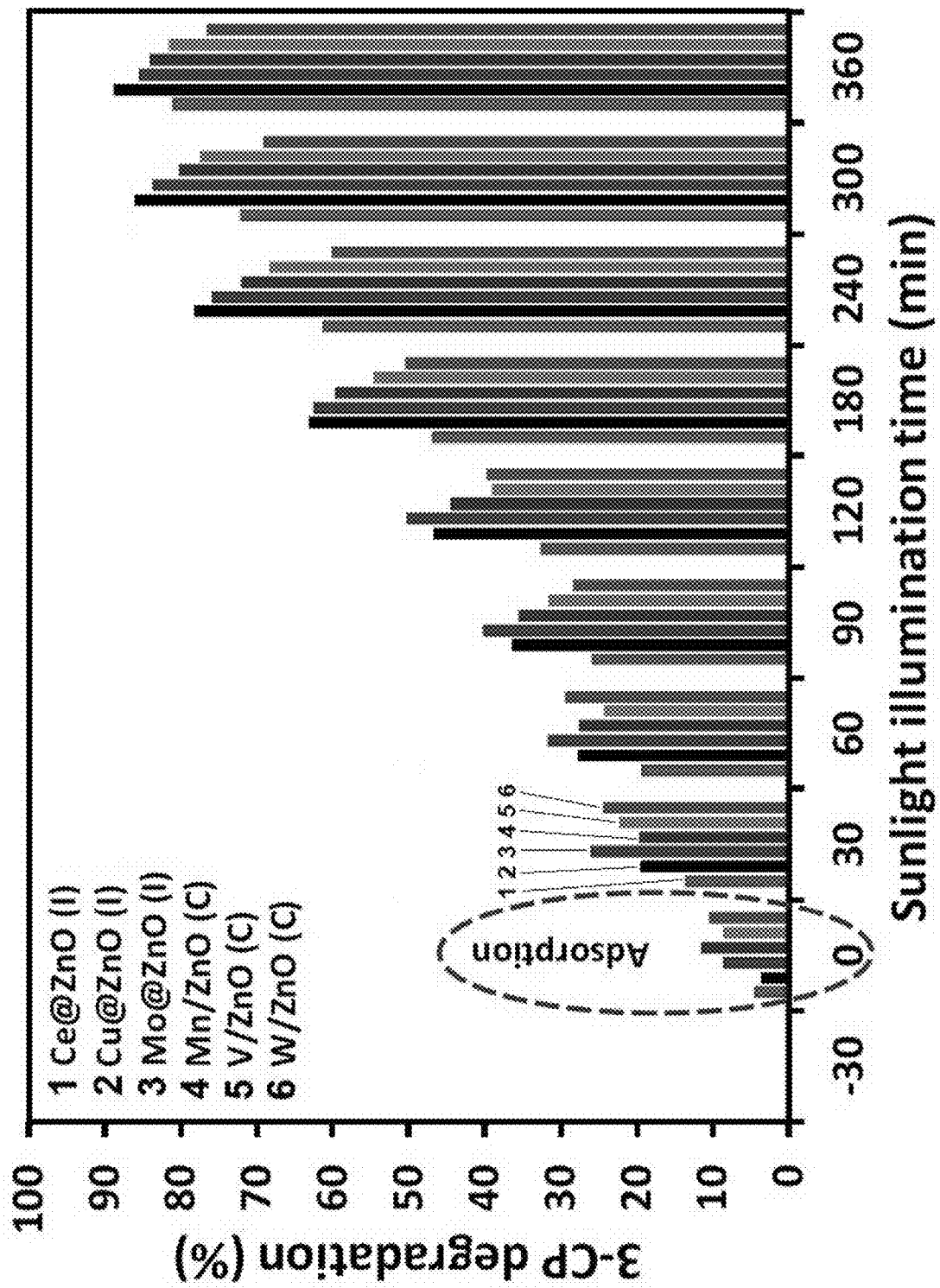
FIG. 6C shows a bar graph charting the removal of 4-chlorophenol over time under natural sunlight exposure in the presence of the photocatalytic materials depicted in FIG. 5A to 5F.
Figure 6D:
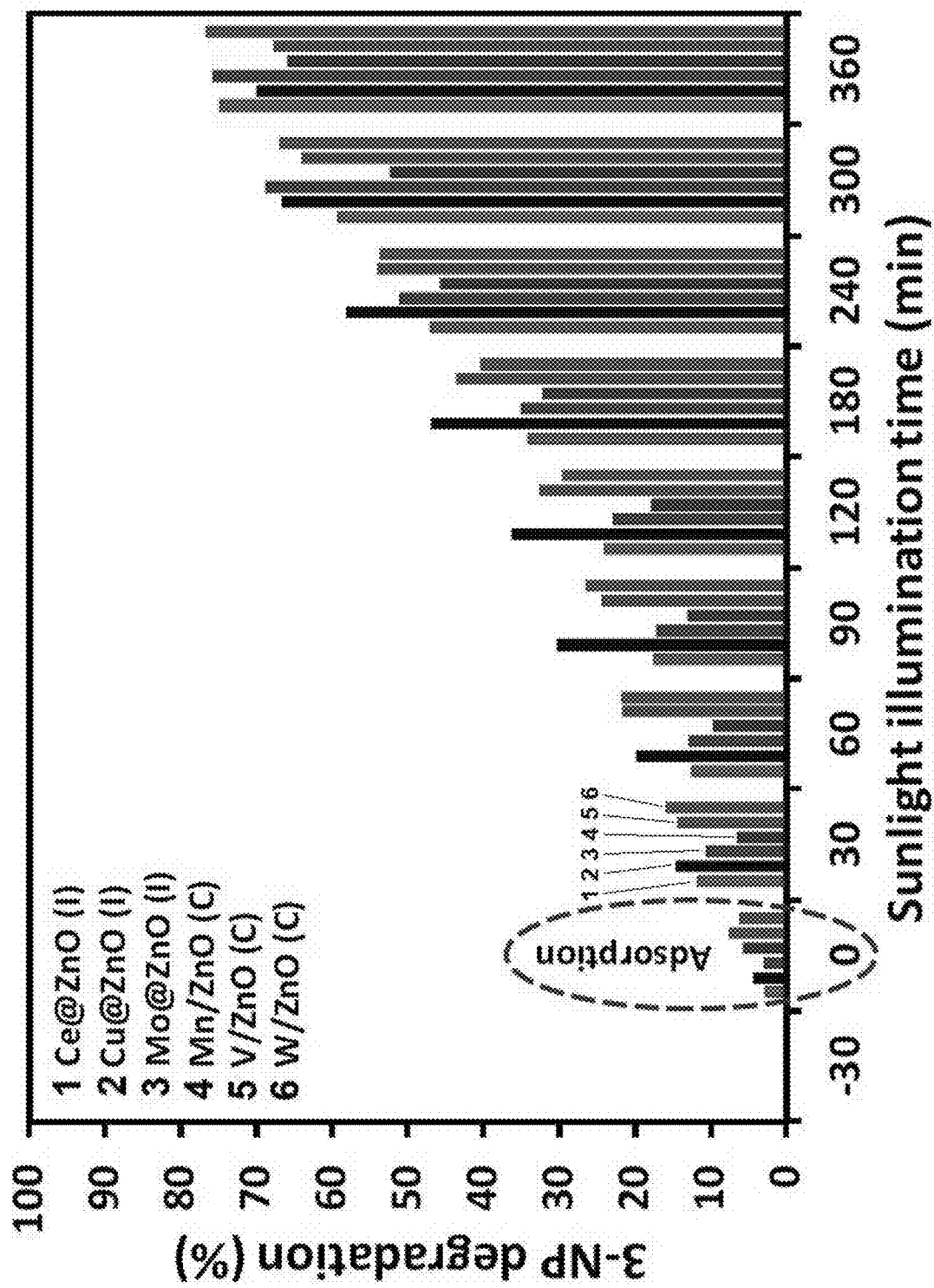
FIG. 6D shows a bar graph charting the removal of 2-nitrophenol over time under natural sunlight exposure in the presence of the photocatalytic materials depicted in FIG. 5A to 5F.
Figure 6E:
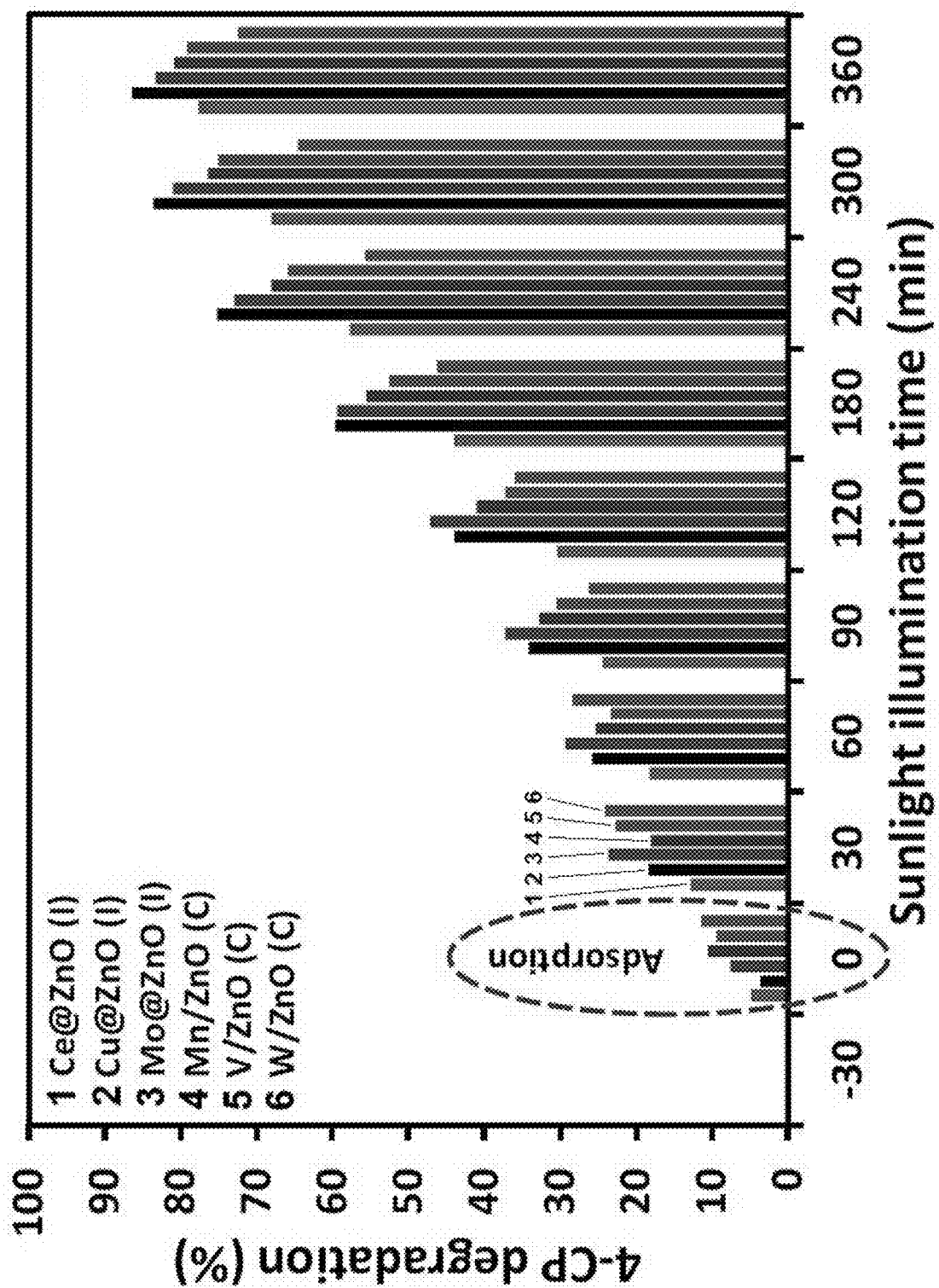
FIG. 6E shows a bar graph charting the removal of 3-nitrophenol over time under natural sunlight exposure in the presence of the photocatalytic materials depicted in FIG. 5A to 5F.
Figure 6F:
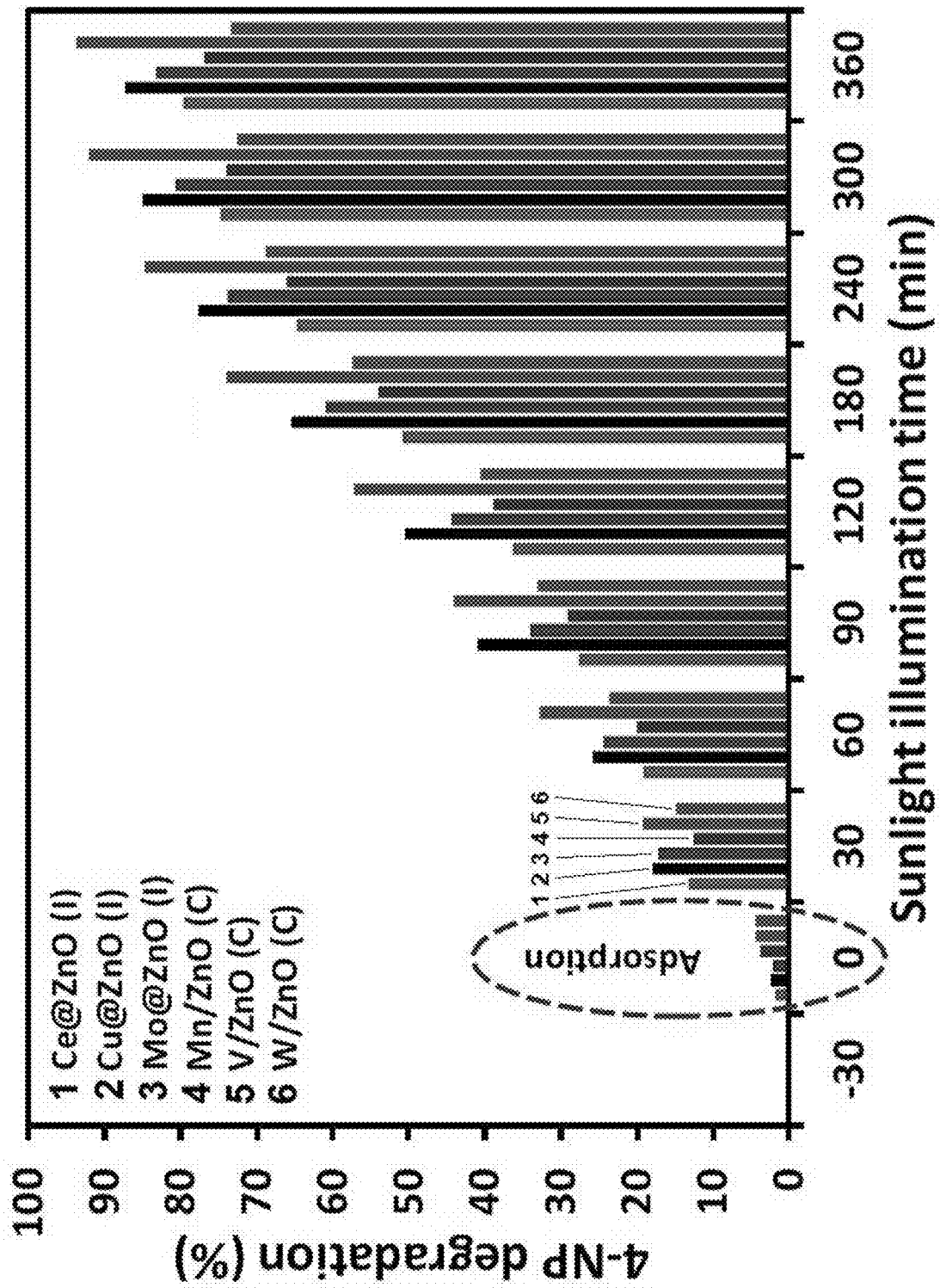
FIG. 6F shows a bar graph charting the removal of 4-nitrophenol over time under natural sunlight exposure in the presence of the photocatalytic material from FIG. 5A to 5F.

FIG. 6A to 6F show time-scaled HPLC chromatograms illustrating the removal/degradation of certain chlorophenols and nitrophenols by selected representative membranes, i.e., those from FIG. 5A to 5F. FIG. 6A shows a bar graph charting the removal of 2-chlorophenol over time under natural sunlight exposure in the presence of the photocatalytic materials depicted in FIG. 5A to 5F. FIG. 6B shows a bar graph charting the removal of 3-chlorophenol over time under natural sunlight exposure in the presence of the exemplary photocatalytic materials. FIG. 6C shows a bar graph charting the removal of 4-chlorophenol over time under natural sunlight exposure in the presence of the exemplary photocatalytic materials. FIG. 6D shows a bar graph charting the removal of 2-nitrophenol over time under natural sunlight exposure in the presence of the exemplary photocatalytic materials. FIG. 6E shows a bar graph charting the removal of 3-nitrophenol over time under natural sunlight exposure in the presence of the exemplary photocatalytic materials. FIG. 6F shows a bar graph charting the removal of 4-nitrophenol over time under natural sunlight exposure in the presence of the exemplary photocatalytic materials.

Figure 7:
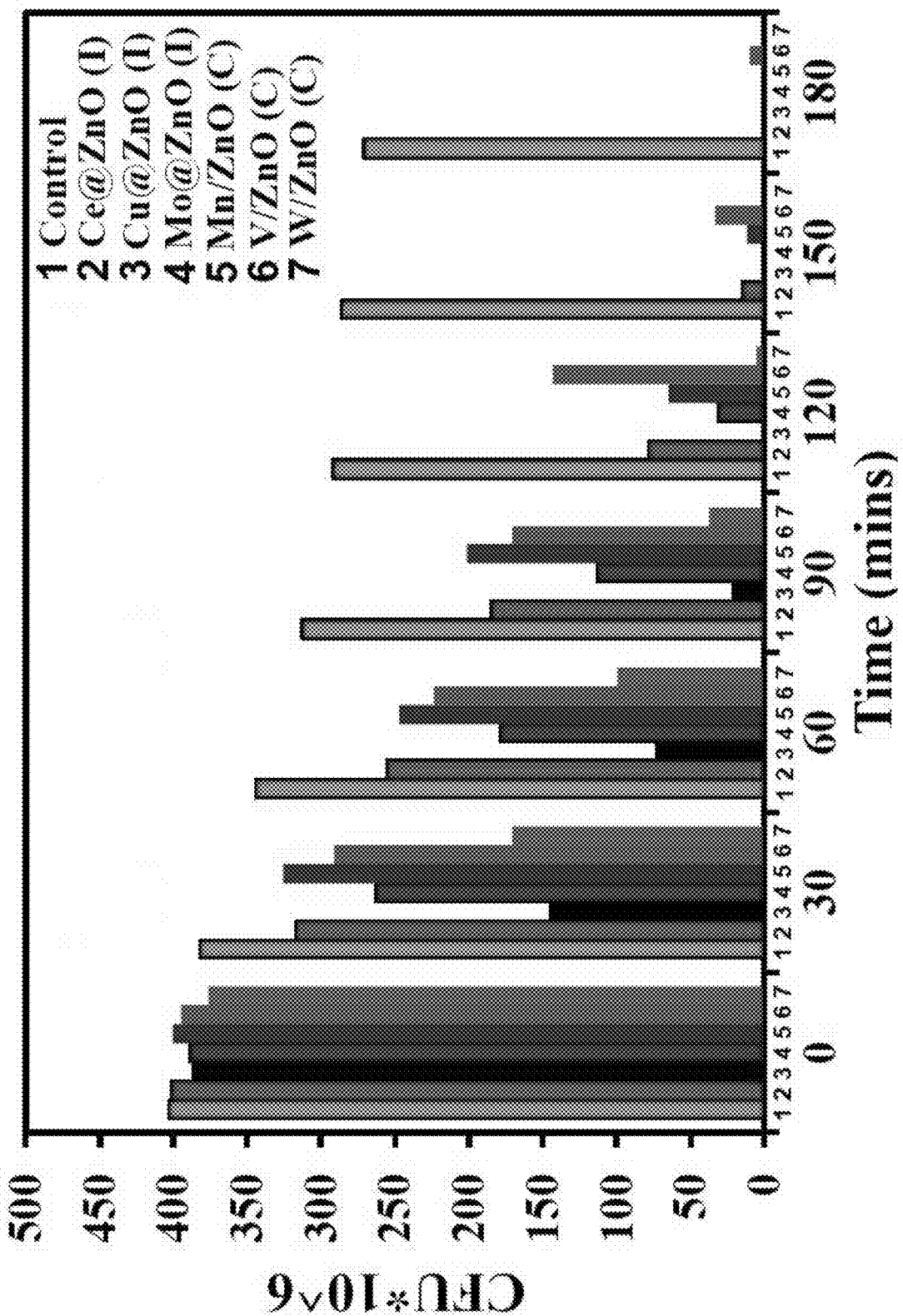
FIG. 7 shows a chart of the antibacterial efficiency of the photocatalytic materials depicted in FIG. 5A to 5F in terms of total bacterial count over time under natural sunlight exposure.

FIG. 7 shows a chart of the antibacterial efficiency of the exemplary photocatalytic materials in terms of total bacterial count over time under natural sunlight exposure, indicating the efficiency of selected membranes for removing/degrading biological contaminants in water.

Numerous modifications and variations of the present invention are possible in light of the above teachings. It is therefore to be understood that within the scope of the appended claims, the invention may be practiced otherwise than as specifically described herein.

The invention claimed is:

1. A photocatalytic material, comprising:
   a composite photocatalyst comprising a metal oxide impregnated with elemental metal particles; and
   a hydrophilic polymer membrane having pores with diameters of less than 2 nm, wherein the hydrophilic polymer membrane comprises a hydrophilic polymer,
   wherein the composite photocatalyst is dispersed within the hydrophilic polymer membrane, wherein at least 95 wt % of the composite photocatalyst is completely enveloped within the hydrophilic polymer membrane,
   wherein the metal oxide comprises $WO_3$, $CeO_2$, $Bi_2O_3$, and/or ZnO, and
   wherein the elemental metal particles comprise at least one elemental metal selected from the group consisting of Cu, Ce, Mn, Mo, V, and W.

2. The material of claim 1, wherein the hydrophilic polymer comprises cellulose acetate, polyether sulfone, polysulfone, and/or polyvinylidene difluoride.

3. The material of claim 2, wherein the hydrophilic polymer is present in the hydrophilic polymer membrane in an amount of at least 90 wt % of all polymers present in the hydrophilic polymer membrane.

4. The material of claim 1, wherein the metal oxide is impregnated with the elemental metal particles in an amount in a range of 0.1 to 50 wt % of a total composite photocatalyst weight.

5. The material of claim 1, wherein at least 95 wt % of metal present in the elemental metal particles is in a zero oxidation state.

6. The material of claim 1, wherein the composite photocatalyst comprises a single metal oxide.

7. The material of claim 1, wherein the composite photocatalyst comprises a single elemental metal.

8. The material of claim 1, wherein the composite photocatalyst comprises:
   at least 95 wt. % of a single metal oxide, relative to all metal oxide present in the photocatalyst; and
   at least 95 wt. % of a single elemental metal, relative to all elemental metal present in the photocatalyst.

9. A method of preparing the material of claim 1, the method comprising:
   (a) heating an aqueous solution comprising an acid, a metal salt, and miscible organic solvent to produce metal oxide comprising $WO_3$, $CeO_2$, $Bi_2O_3$, and/or ZnO;
   (b) mixing an aqueous solution of a precursor of at least one metal selected from the group consisting of Cu, Ce, Mn, Mo, V, and W and the metal oxide to form a mixture comprising the metal embedded in the metal oxide;
   (c) heating and/or calcining the mixture to form a photocatalyst;
   (d) blending the photocatalyst with a solution comprising a polymer in a solvent to form a solution and/or compounding the photocatalyst with the polymer to form a compounded melt, in a mass relationship of the photocatalyst in a range of from 0.1 to 100 wt. % of a weight of the polymer, wherein the polymer is hydrophilic and comprises pores having diameters up to 2 nm; and
   (e) forming a membrane.

10. The method of claim 9, wherein the heating (a) is at a temperature in a range of from 80 to 160° C.

11. The method of claim 9, wherein the heating (a) is for a time in a range of 2 to 24 hours.

12. The method of claim 9, wherein the acid in the heating (a) comprises at least 25 wt. % acetic acid, relative to all acids in the mixture.

13. The method of claim 9, wherein the solvent in the heating (a) is an alcohol.

14. The method of claim 9, wherein the forming (e) comprises casting the solution or extruding the compounded melt.

15. The method of claim 9, wherein the heating (c) comprises bringing the mixture to dryness, adding a flammable liquid, and igniting to form the photocatalyst.

16. A method of preparing the material of claim 1, the method comprising:
   blending the photocatalyst with a solution comprising a polymer in a solvent and/or compounding the photocatalyst with the polymer; and
   forming a membrane.

17. A method of inactivating at least one biological contaminant in water, the method comprising:
   while irradiating with a source of UV and/or visible light, contacting the material of claim 1 with contaminated water.

18. The material of claim 1, wherein the metal oxide is ZnO.

19. The material of claim 2, wherein the hydrophilic polymer is cellulose acetate.

20. The material of claim 1, wherein the hydrophilic polymer membrane consists of cellulose acetate.

* * * * *